(12) United States Patent
Smith et al.

(10) Patent No.: US 7,143,589 B2
(45) Date of Patent: Dec. 5, 2006

(54) SORPTION COOLING SYSTEMS, THEIR USE IN AUTOMOTIVE COOLING APPLICATIONS AND METHODS RELATING TO THE SAME

(75) Inventors: Douglas M. Smith, Albuquerque, NM (US); Kevin Roderick, Albuquerque, NM (US); Peter L. Campbell, Albuquerque, NM (US)

(73) Assignee: Nanopore, Inc., Albuquerque, NM (US)

( * ) Notice: Subject to any disclaimer, the term of this patent is extended or adjusted under 35 U.S.C. 154(b) by 16 days.

(21) Appl. No.: 11/147,971

(22) Filed: Jun. 8, 2005

(65) Prior Publication Data

US 2005/0268633 A1  Dec. 8, 2005

Related U.S. Application Data

(60) Provisional application No. 60/578,119, filed on Jun. 8, 2004.

(51) Int. Cl.
  *F25D 17/06* (2006.01)

(52) U.S. Cl. .......................................... 62/94; 62/238.3

(58) Field of Classification Search ............... 62/93, 62/94, 112, 271, 315, 447, 480, 238.3; 165/54, 165/62, 97, 119; 96/154
See application file for complete search history.

(56) References Cited

U.S. PATENT DOCUMENTS

| 2,075,036 | A |   | 3/1937  | Hollis ............................ 183/4 |
|-----------|---|---|---------|-----------------------------------------|
| 4,138,850 | A | * | 2/1979  | Tchernev ................. 60/641.14 |
| 4,161,211 | A |   | 7/1979  | Duffy et al. .................... 165/1 |
| 4,180,985 | A |   | 1/1980  | Northrup, Jr. .................. 62/94 |
| 4,187,695 | A |   | 2/1980  | Schumacher ................. 62/503 |
| 4,269,611 | A |   | 5/1981  | Anderberg ................... 55/179 |
| 4,341,539 | A |   | 7/1982  | Gidaspow et al. ............ 55/278 |
| 4,523,631 | A |   | 6/1985  | McKinney .................... 165/43 |
| 4,548,046 | A | * | 10/1985 | Brandon et al. ............... 62/79 |
| 4,574,874 | A |   | 3/1986  | Duran ......................... 165/43 |
| 4,577,471 | A |   | 3/1986  | Meckler ...................... 62/271 |
| 4,582,129 | A |   | 4/1986  | Yano et al. .................... 165/97 |
| 4,589,892 | A |   | 5/1986  | Leonard ...................... 55/162 |
| 4,645,519 | A |   | 2/1987  | Fraioli et al. ................. 55/208 |
| 4,654,057 | A |   | 3/1987  | Rhodes ........................ 55/208 |
| 4,660,629 | A |   | 4/1987  | Maier-Laxhuber et al. ..................... 165/104.12 |
| 4,691,530 | A |   | 9/1987  | Meckler ..................... 62/238.1 |
| 4,700,550 | A |   | 10/1987 | Rhodes ........................ 62/271 |
| 4,711,097 | A |   | 12/1987 | Besik .......................... 62/271 |
| 4,786,301 | A |   | 11/1988 | Rhodes ........................ 62/271 |
| 4,830,641 | A |   | 5/1989  | White, Jr. et al. ............ 55/161 |
| 4,887,438 | A |   | 12/1989 | Meckler ...................... 62/271 |
| 4,924,676 | A |   | 5/1990  | Maier-Laxhuber et al. .... 62/59 |

(Continued)

FOREIGN PATENT DOCUMENTS

JP       08000944  A  *  1/1996

(Continued)

*Primary Examiner*—Mohammad M. Ali
(74) *Attorney, Agent, or Firm*—Marsh Fischmann & Breyfogle LLP

(57) ABSTRACT

A sorption cooling system for providing cooled air to the cabin of a vehicle. The sorption cooling system includes an evaporator, a condenser adapted to fluidly communication with the evaporator, and a plurality of adsorbent beds adapted for fluid communication with the condenser and the evaporator. Each adsorbent bed includes a fluid impermeable casing, desiccant sheets having apertures therethrough, a refrigerant flow path for flowing a refrigerant proximal to a first side of the desiccant sheets, and a coolant flow path for flowing a coolant fluid proximal to a second side of the desiccant sheets. The apertures are a portion of one of the refrigerant and coolant flow paths.

24 Claims, 26 Drawing Sheets

U.S. PATENT DOCUMENTS

| | | | |
|---|---|---|---|
| 4,971,611 A | 11/1990 | Noguchi | 55/181 |
| 5,038,581 A * | 8/1991 | Maier-Laxhuber et al. | 62/457.9 |
| 5,042,266 A | 8/1991 | Yamashita et al. | 62/271 |
| 5,054,544 A * | 10/1991 | Maier-Laxhuber et al. | 165/104.12 |
| 5,146,767 A | 9/1992 | Kadle et al. | 62/474 |
| 5,222,375 A | 6/1993 | Conrad et al. | 62/271 |
| 5,291,942 A * | 3/1994 | Ryan | 165/104.12 |
| 5,298,054 A | 3/1994 | Malik | 95/99 |
| 5,308,703 A | 5/1994 | Tsujimoto et al. | 428/408 |
| 5,333,471 A | 8/1994 | Yamada | 62/476 |
| 5,335,719 A | 8/1994 | Khelifa et al. | 165/42 |
| 5,351,497 A | 10/1994 | Lowenstein | 62/94 |
| 5,388,423 A | 2/1995 | Khelifa | 62/238.3 |
| 5,388,637 A * | 2/1995 | Jones et al. | 165/104.12 |
| 5,404,728 A | 4/1995 | Maier-Laxhuber | 62/106 |
| 5,435,150 A | 7/1995 | Khelifa et al. | 62/271 |
| 5,456,093 A | 10/1995 | Dunne et al. | 62/480 |
| 5,460,004 A | 10/1995 | Tsimerman | 62/94 |
| 5,477,705 A * | 12/1995 | Meunier | 62/480 |
| 5,477,706 A | 12/1995 | Kirol et al. | 62/480 |
| 5,509,275 A | 4/1996 | Bhatti et al. | 62/271 |
| 5,514,035 A | 5/1996 | Denniston | 454/121 |
| 5,518,977 A * | 5/1996 | Dunne et al. | 502/68 |
| 5,535,817 A | 7/1996 | Dunne | 165/104.12 |
| 5,556,028 A | 9/1996 | Khelifa | 237/12.3 A |
| 5,579,647 A | 12/1996 | Calton et al. | 62/94 |
| 5,585,145 A * | 12/1996 | Maier-Laxhuber et al. | 427/380 |
| 5,619,866 A | 4/1997 | Sato et al. | 62/480 |
| 5,697,223 A | 12/1997 | Ishii et al. | 62/94 |
| 5,749,244 A | 5/1998 | Murayama et al. | 62/476 |
| 5,768,908 A | 6/1998 | Tanaka et al. | 62/332 |
| 5,806,323 A | 9/1998 | Bevier | 62/91 |
| 5,807,422 A | 9/1998 | Grgich et al. | 95/10 |
| 5,817,167 A | 10/1998 | DesChamps | 95/113 |
| 5,826,434 A | 10/1998 | Belding et al. | 62/90 |
| 5,852,768 A | 12/1998 | Jacobsen et al. | 419/63 |
| 5,873,256 A | 2/1999 | Denniston | 62/91 |
| 5,878,590 A | 3/1999 | Kadle et al. | 62/271 |
| 5,896,747 A | 4/1999 | Antohi | 62/101 |
| 5,927,084 A | 7/1999 | Fielding | 62/90 |
| 5,966,955 A | 10/1999 | Maeda | 62/238.3 |
| 6,029,462 A | 2/2000 | Denniston | 62/94 |
| 6,092,375 A | 7/2000 | Denniston | 62/94 |
| 6,102,107 A | 8/2000 | Dunne | 165/104.12 |
| 6,165,252 A | 12/2000 | Kendall | 95/90 |
| 6,196,014 B1 | 3/2001 | Maeda | 62/271 |
| 6,205,805 B1 | 3/2001 | Takahashi et al. | 62/271 |
| 6,293,998 B1 | 9/2001 | Dolan et al. | 95/96 |
| 6,308,525 B1 | 10/2001 | Ike et al. | 62/271 |
| 6,334,316 B1 | 1/2002 | Maeda et al. | 62/94 |
| 6,360,550 B1 | 3/2002 | Klapp et al. | 62/94 |
| 6,364,937 B1 | 4/2002 | McMahon | 95/118 |
| 6,364,942 B1 | 4/2002 | Felber et al. | 96/111 |
| 6,370,900 B1 | 4/2002 | Maeda | 62/271 |
| 6,391,091 B1 | 5/2002 | McMahon | 95/116 |
| 6,406,522 B1 | 6/2002 | McFadden et al. | 95/113 |
| RE37,779 E | 7/2002 | Kuma et al. | 428/143 |
| 6,478,855 B1 | 11/2002 | Okano | 95/113 |
| 6,481,222 B1 | 11/2002 | Denniston | 62/94 |
| 6,514,318 B1 | 2/2003 | Keefer | 95/96 |
| 6,527,836 B1 | 3/2003 | White, Jr. et al. | 96/113 |
| 6,532,762 B1 * | 3/2003 | Smith et al. | 62/480 |
| 6,559,096 B1 | 5/2003 | Smith et al. | 502/411 |
| 6,604,374 B1 | 8/2003 | Ito et al. | 62/238.3 |
| 6,623,550 B1 | 9/2003 | Shah et al. | 96/134 |
| 6,644,059 B1 | 11/2003 | Maeda et al. | 62/271 |
| 6,711,907 B1 | 3/2004 | Dinnage et al. | 62/94 |
| 6,718,790 B1 * | 4/2004 | Moriguchi et al. | 62/315 |
| 6,751,964 B1 | 6/2004 | Fischer | 62/94 |
| 6,973,963 B1 * | 12/2005 | Dunne et al. | 165/104.12 |
| 7,033,421 B1 * | 4/2006 | Smith et al. | 96/135 |
| 2003/0005719 A1 | 1/2003 | Mitani et al. | 62/402 |
| 2003/0121276 A1 | 7/2003 | Maeda | 62/271 |
| 2003/0167925 A1 | 9/2003 | Aikawa et al. | 96/126 |
| 2003/0221438 A1 | 12/2003 | Rane et al. | 62/271 |
| 2004/0007011 A1 | 1/2004 | Tanaka | 62/434 |
| 2004/0060447 A1 | 4/2004 | Powell et al. | 96/154 |
| 2004/0093876 A1 | 5/2004 | Inagaki et al. | 62/112 |
| 2004/0123615 A1 | 7/2004 | Yabu | 62/271 |
| 2004/0134211 A1 | 7/2004 | Lee et al. | 62/271 |

FOREIGN PATENT DOCUMENTS

| | | |
|---|---|---|
| JP | 2004-130944 | 4/2004 |
| WO | WO 96/25636 | 8/1996 |

* cited by examiner

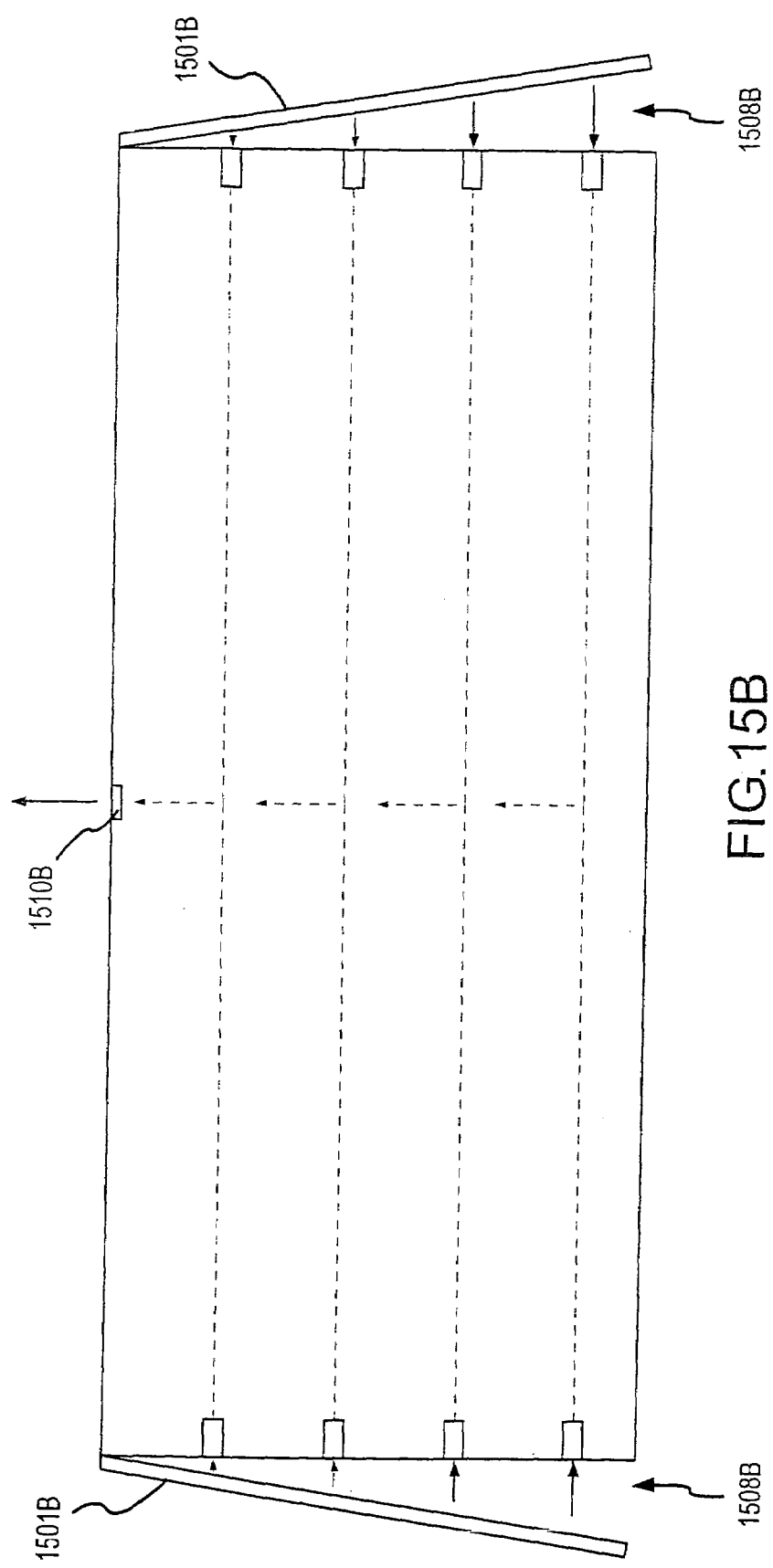

SORPTION COOLING SYSTEMS, THEIR USE IN AUTOMOTIVE COOLING APPLICATIONS AND METHODS RELATING TO THE SAME

CROSS-REFERENCE TO RELATED APPLICATIONS

This application claims priority to U.S. Provisional Patent Application No. 60/578,119, filed Jun. 8, 2004, and entitled "METHOD AND APPARATUS FOR COOLING THE INTERIOR OF A VEHICLE", and is related to U.S. Provisional Application No. 60/688,593 filed Jun. 8, 2005, and entitled "MULTIPLE STAGE SORPTION COOLING APPARATUS, SYSTEM AND METHOD", each of which is incorporated herein by reference in its entirety.

BACKGROUND OF THE INVENTION

1. Field of the Invention

This invention relates to sorption cooling systems incorporating a compact, lightweight evaporator and adsorbent bed structure and the use of such sorption cooling systems in vehicles.

2. Description of Related Art

Air-conditioning a car, truck or other motorized vehicle can consume a non-trivial amount of engine motive power. The load from the air-conditioner compressor may affect both fuel efficiency and engine emission levels. Tests conducted by the Society of Automotive Engineers have shown that operation of a standard air-conditioner can decrease vehicle fuel economy by 4.5 miles per gallon, increase NOx emissions by 0.6 grams per mile and increase CO production by 12 grams per mile. These effects became more dramatic as ambient temperature is increased, as humidity is increased, and when a solar load is imposed on the car. In addition to fuel economy and emissions, operation of the air-conditioner gives a clearly perceivable decrease in vehicle performance.

The size of a standard air-conditioner is generally fixed by the required cooling rate. When a vehicle air-conditioner is started, the air temperature and relative humidity may be high. Producing the desired temperature of cooled air often requires chilling the air (whether it is fresh air, recirculated cabin air, or a blend) to below the dew point of the air. This means that large amounts of the air-conditioner cooling capacity may be used to condense water in the air (where it collects in the evaporator), instead of for cooling the air. FIG. 1 illustrates this effect, which depicts the percentage of the total cooling loads attributable to water condensation as a function of relative humidity and temperature. As shown, higher inlet air temperatures and/or humidity may cause over 50% of the air conditioner power to be used in condensing water. Even in dry climates, condensation limits cooling. FIG. 2 illustrates the cyclical operation of a vehicle on a day with an outside ambient temperature of 95–104° F. (35–40° C.) and humidity of 15%. The cycling of humidity in the interior of the vehicle illustrates the effect of water condensation on the rate of interior cooling even in dry climates. This effect can be even further exacerbated in a climate that produces high solar loads.

Due to the issue of cooling loads from humid and/or high temperature conditions, vehicle manufacturers generally design air-conditioners so that they are able to cool a vehicle on start-up in hot and humid climates. Often this results in an over-sized air-conditioning unit, which increases capital costs and weight and unnecessarily wastes energy. This is particularly problematic for vehicles powered by alternative means, such as hybrid, electric, and fuel cells. The use of over-sized air-conditioners also increases pollution since extra fuel is required during start-up when the engine efficiency is still low. An additional problem with conventional vehicle air-conditioners is the odor from bacterial growth in the evaporator.

One approach to increasing air-conditioner efficiency and decreasing its size is to dehumidify the air prior to cooling it with the air-conditioner. For example, PCT Publication No. WO 96/25636 to Denniston discloses dehumidification systems for use in the dehumidification and/or humidification of air prior to its entry into the interior of a vehicle. The publication discloses various bed structures that may be used to dehumidify air and that waste heat from the engine may be used to heat air that is used to regenerate the bed.

U.S. Pat. No. 5,509,275 to Bhatti et al. discloses the use of a desiccant, such as a zeolite, in a desiccant wheel to dehumidify an air stream supplied to the interior of a vehicle. Fresh air is dehumidified in one portion of the wheel and fed to the evaporator of the compression-based air-conditioning system while the other portion of the wheel is regenerated using air heated by waste heat from the engine.

It is believed that these air drying technologies are not currently employed in commercial vehicles due to cost, weight considerations, and inefficiencies that do not always result in a reduction in the size of the air-conditioner.

Another approach to increasing efficiency of a vehicle cooling system is to employ waste heat generated by the vehicle to operate systems that aid the compression-based air-conditioner, or, in some circumstances, completely obviate the need for the compression-based air conditioner. Approximately 60% of a vehicle's fuel value is lost to the exhaust (33%) and engine cooling (27%). Fuel efficiency could be significantly improved and emissions reduced by employing engine waste heat in the operation of a cooling system. One approach for using such waste heat is to generate electricity from engine waste heat using thermoelectrics and use that electricity to power the air-conditioner. However, the cost, weight and lifetime of such electric generation technology is generally unacceptable. Other cooling technologies include thermoacoustic cooling, ejector cooling and Peltier coolers, but such technologies are generally unproven.

Another method for employing waste heat is to utilize systems comprising an absorber and a reservoir of water, where fresh or recycled air is dehumidified in the absorber and the dehumidified air is subsequently passed over the reservoir of water, where the water evaporates into the dry air to cool and moisten it. Waste heat may be utilized to continuously regenerate an absorbent contained in the absorber. For example, U.S. Pat. No. 5,388,423 to Khelifa discloses such a dehumidifying and subsequent rehumidifying process using an absorbent, such as a zeolite, in providing cooled air to the interior of a vehicle. However, such systems generally require an onboard water storage tank that must be periodically replenished to accomplish the evaporative cooling.

Another approach for utilizing waste heat from the vehicle is the use of a sorption cooling process. A sorption cooling process generally comprises the sequential evaporation, adsorption, regeneration and condensation of a refrigerant to produce cooling. In operation, a working refrigerant is evaporated in an evaporator thereby cooling the surfaces of the evaporator due to the energy required to vaporize the refrigerant. A fluid (e.g., air) is passed over the cooled evaporator surface to cool such fluid. Elsewhere, the evaporated refrigerant is adsorbed by an adsorbent (e.g., a desiccant). The adsorption generally generates heat, which is usually rejected to ambient air. After the adsorbent capacity has been reached, the adsorbent may be regenerated, such as by heating it, to release the adsorbed refrigerant. The desorbed refrigerant is then passed to a condenser to liquefy the refrigerant. The cooling cycle may then be repeated.

Sorption cooling processes are desirable for many reasons. In contrast to standard compression-based air-conditioning systems, the condensation process only requires a small amount of mechanical work to return the refrigerant to its liquid-phase. Thus, the use of a sorption cooling system would decrease the amount of work required to cool the vehicle. Moreover, sorption cooling can provide cooling even when the engine is not running. Also, sorption cooling processes can utilize environmentally friendly refrigerants, such as water. Thus, the use of sorption cooling is a desirable alternative to traditional vehicle air-conditioning processes.

Various attempts have been made to utilize a sorption cooling process in the cooling of a vehicle using liquid-phase absorbents. For example, U.S. Pat. No. 5,896,747 to Antohi discloses the use of an absorbent-based air-conditioning system using engine coolant as the heat source. However, Antohi discloses the use of a liquid-based absorbent, which is not preferred for many reasons. First, liquid-liquid based sorption systems are difficult to separate and purify. Azeotropes and entrainment, among others, can cause the purity of the absorption material to decrease over time, which decreases the efficiency of the process. Additionally, complex pressure and/or temperature variation systems are generally required to separate such solutions, which adds to the complexity of the system. Finally, it is sometimes difficult to achieve the necessary kinetics with the use of liquid absorbents due to limitations in surface area.

Sorption cooling processes using a solid-phase adsorbent are also known. These processes can be categorized into those utilizing gas-phase materials (e.g., hot exhaust air), those utilizing liquid-phase materials (e.g., hot liquids from the engine/radiator), and those utilizing electric sources to regenerate the adsorbent.

U.S. Pat. No. 4,924,676 to Maier-Laxhuber et al., U.S. Pat. No. 5,298,054 to Malik, U.S. Pat. No. 5,333,471 to Yamada and U.S. Pat. No. 5,404,728 to Maier-Laxhuber all disclose the use of a gas-phase materials to heat/regenerate the adsorbent. There are many drawbacks in using gas-phase materials to regenerate the adsorbent, including: (a) high regeneration temperatures to achieve the heat transfer necessary to accomplish the regeneration, (b) increased exhaust pressure drop in the exhaust manifold, which is detrimental to fuel economy and/or exhaust emissions, (c) increased corrosion, (d) use of large heat exchangers, (e) control difficulties related to the high and wide-ranging gas-phase temperatures, (f) water and acid gas condensation in the heat exchangers, and (g) decreased catalytic converter performance, especially on start-up. Also, because of the high temperatures, restrictions are placed on the materials of construction, including the types of adsorbents that may be used. Also, many traditional adsorbents, such as zeolites, require very low operating pressures to be effectively utilized.

U.S. Pat. No. 5,477,706 to Kirol et al. and U.S. Pat. No. 5,768,908 to Tanaka et al. disclose the use of electric heating elements to regenerate the adsorbent. While such systems may be effective for regeneration, electrical regeneration systems add extra complexity to the adsorption system in that a sufficient amount of wires must be placed throughout the adsorbent bed to accomplish the necessary heat transfer to regenerate the absorbent. Electrical systems also add to the complexity of the wiring of the vehicle.

Liquid-phase regeneration systems are also known and various attempts have been made to utilize these materials in a vehicle sorption cooling system. U.S. Pat. No. 4,574,874 to Duran discloses a chemisorption apparatus for use as a vehicle air conditioner. Duran discloses that a high temperature input is applied to the lower parts of a series of elements in one sector of the housing, where a reactant is desorbed from a solid-phase adsorbent and moves to the upper part of the elements, where heat is removed by a fluid medium to an external heat sink. As the series of elements are rotated to another sector of the housing, heat is removed from the lower parts of the elements by heat exchange to a heat sink. Seeking chemical equilibrium, the reactant moves downward to be re-adsorbed in the adsorbent material, and the evaporation in the upper parts of the elements produces a cooling output, which is utilized to cool an output fluid medium.

U.S. Pat. No. 5,619,866 to Sato et al. discloses a multiple-stage adsorption cooling system for providing cooling to a vehicle. Sato et al. disclose that two or more adsorbers function in adsorbing/heating operations while two or more other adsorbers function in desorption operations. Sato et al. provide that the evaporation of water from an evaporator provides the cooling in conjunction with cooling pipes that cool the absorbing systems while heating pipes heat the desorbing system.

Hybrid compression-based air-conditioners assisted by sorption cooling processes are also known. U.S. Patent Publication No. 2004/0093876 to Inagaki et al. discloses an adsorbent cooling system that may be used in vehicles to cool the interior, assist in air-conditioning, and heat the engine. Inagaki et al. disclose a cooling system having an adsorption chamber that includes an adsorbent, preferably a ferroaluminophosphate, which adsorbs an adsorbate, such as water. Inagaki et al. disclose that a traditional compression-based air-conditioner may be used in conjunction with the adsorption process.

Although there are many fuel efficiency and emission reduction reasons to employ sorption cooling instead of conventional vapor compression cooling, it is believed sorption cooling processes are not currently used in vehicle cooling processes for at least three reasons. First, many adsorbents require high regeneration temperatures. The use of high regeneration temperatures necessitates the use of exhaust heat from the vehicle to regenerate the absorbent, as described above.

Second, most absorbents have a relatively low adsorption capacity (e.g., zeolites absorb ~0.2 grams of water per gram of zeolite), which necessitates the use of large amounts of adsorbent to achieve the desired cooling rates. When a large mass of adsorbent is employed, it is difficult to extract heat therefrom, which further slows down the cooling cycle time, thereby necessitating an even greater adsorbent mass. High desiccant mass in combination with the requirement for high temperature packaging results in a high thermal mass of the entire system. A high thermal mass may lead to high parasitic energy losses of the absorption system. This effect may be compounded with the use of traditional absorbents, such as zeolites, which normally have water heats of adsorption approaching twice the heat of vaporization of water. The net effect of such a high thermal mass and heats of absorption results in a system that must reject twice as much heat as cooling that is produced. This increases the required blower power for the cooling step and further reduces the COP (coefficient of performance).

Third, since a high volume of adsorbent is generally required, an increased number of adsorbent beds is generally used, which translates to an increased amount of high temperature materials of construction, larger area evaporators and condensers, and larger blowers that must be used to operate the system. Such large adsorbent cooling systems are impractical and too expensive to be utilized as a vehicle air-conditioning system. Thus, despite the promise of sorption cooling process for vehicle air-conditioning, the technology has not achieved commercial success.

Another application of waste heat is in providing a cooled fluid to a building. Today, many standard industrial processes use energy cogeneration to increase the efficiency of their heating and electrical generation processes. Cogeneration is the simultaneous production of electricity and useful heat, usually in the form of either hot water or steam, from one primary fuel, such as a fossil fuel. While cogeneration is useful, much of the heat produced by the electrical and/or heat generation techniques goes unused. Moreover, many industrial applications also desire the production of a cooled fluid to utilize in cooling applications, such as air-conditioning of buildings. Therefore, there has been effort to utilize cogeneration waste heat to also generate a cooled fluid. This energy concept is called trigeneration. While attractive, there are many hurdles to producing an efficient trigeneration cooling system, including the production of an efficient adsorption system capable of producing a cooled fluid from the waste heat of a cogeneration system.

SUMMARY OF THE INVENTION

It is an object of the present invention to provide a lightweight, compact sorption cooling system capable of sufficiently cooling air provided to the cabin of a vehicle without the use of a traditional, compression-based air conditioner. It is an object of this invention to use low-grade waste heat from the internal combustion engine of a vehicle to provide the necessary thermal energy to regenerate the adsorbent bed of the sorption cooling system. These and other objects are realized by employing a unique, new adsorbent bed structure and/or evaporator within the sorption cooling system. An adsorbent bed capable of high adsorption rates, high heat rejection rates, and high regeneration rates decreases the volume necessary to achieve sufficient cooling rates within the sorption cooling system. Preferably, the adsorbent bed utilizes a high capacity desiccant that can be regenerated at a relatively low temperature, avoiding the use of exhaust gas for regeneration. Preferably, the desiccant has a low heat of adsorption, rapid heat and mass transfer kinetics, a long lifetime, and a relatively low cost.

In one embodiment of the present invention, a closed-loop sorption cooling system for providing cooled air to the cabin of a vehicle is provided. The sorption cooling system includes an evaporator, a refrigerant source, such as a condenser, adapted to fluidly communicate with the evaporator, and a plurality of adsorbent beds adapted to fluidly communicate with the condenser and the evaporator. In a particular embodiment, the sorption cooling system is an element portion of a multiple-stage sorption cooling system. In a particular embodiment, the refrigerant fluid of the sorption cooling system consists essentially of water.

The plurality of adsorbent beds each have a fluid impermeable casing having a refrigerant inlet, a refrigerant outlet, a coolant inlet and coolant outlet. The adsorbent beds also include a plurality of desiccant sheets, such as first and second desiccant sheets. The desiccant sheets generally have an adsorbent first side and are covered by a fluid impermeable barrier on a second side. The desiccant sheets each include at least one aperture, such as at least two apertures, extending through the desiccant sheets. The apertures of the desiccant sheets are a portion of one of a refrigerant flow path and a coolant flow path. In a particular embodiment, at least one of the refrigerant flow path and the coolant flow path is non-linear. In one embodiment, both the refrigerant flow path and the coolant flow path are non-linear.

A refrigerant flow path for flowing a refrigerant fluid between the refrigerant inlet and refrigerant outlet extends through each adsorbent bed. The refrigerant flow path is at least partially defined by the first (adsorbent) sides of the desiccant sheets. Preferably, the adsorbent sides of opposing desiccant sheets face each other to help define at least a portion of the refrigerant flow path. In one embodiment, the desiccant sheets are substantially parallel to one another and are separated by not more than 5 mm. In one embodiment, the apertures are a portion of the refrigerant flow path and the refrigerant flow path is non-linear.

A coolant flow path for flowing a coolant fluid between the coolant inlet and coolant outlet also extends through each adsorbent bed. The coolant flow path is fluidly isolated from the refrigerant flow path, but is adjacent to at least one of the desiccant sheets. In one embodiment, the apertures are a portion of the coolant flow path and the coolant flow path is non-linear. The coolant fluid is preferably in the liquid phase. In one embodiment, the coolant fluid is a liquid-phase fluid used in the cooling of an internal combustion engine.

The pressure within the major components of the sorption cooling system is generally relatively low (e.g., near ambient). In one embodiment, the pressure within any of the evaporator, the condenser and the plurality of adsorbent beds does not exceed 14.7 psig (101.3 kPa).

In one embodiment, the adsorbent bed includes at least three desiccant sheets, each of the desiccant sheets having at least one aperture extending therethrough, where the apertures define at least a portion of one of the refrigerant flow path and the coolant flow path. Preferably, a coolant flow path is adjacent to both a first and second desiccant sheet.

In one embodiment, at least one of the desiccant sheets includes a carbon material impregnated with a metal salt. In a particular embodiment, the metal salt is selected from the group consisting of lithium chloride, calcium chloride and mixtures thereof.

In one embodiment, the evaporator is a thin-film evaporator fluidly connected to the refrigerant source. The thin-film evaporator includes a sheet of vapor permeable and liquid impermeable membrane material, an air flow channel proximal to the first side of the membrane material, a refrigerant flow channel proximal to the second side of the membrane material, and a thermally conductive sidewall proximal to the refrigerant flow channel.

The present invention also contemplates a method for providing cooled air to the interior of a vehicle. The method generally includes the steps of evaporating an aqueous-based refrigerant in an evaporator having a thermally conductive sidewall, flowing air proximal to (e.g., adjacent to, in contact with) the thermally conductive sidewall, adsorbing the aqueous-based refrigerant in an adsorber, and providing cooled air to the interior of the vehicle. The method may also include the steps of circulating a hot liquid-phase coolant through a coolant flow path of the adsorber, condensing the aqueous-based refrigerant, and supplying the condensed aqueous-based refrigerant to the evaporator. A cold coolant may also be circulated through the coolant flow path of the adsorber. In one embodiment, the cold coolant is in a liquid phase. In one embodiment, the circulating the cold coolant step and the circulating the hot liquid-phase coolant step are non-overlapping.

In one embodiment the adsorber is a first adsorber, the coolant flow path is a first coolant flow path, and the method further includes circulating a cold coolant through the first coolant flow path of the first adsorber during the adsorbing step and circulating a hot liquid-phase coolant through a second coolant flow path of a second adsorber. In one embodiment, the circulating the cold coolant through the first coolant flow path and the circulating the hot liquid-phase coolant through the second flow path steps are at least partially overlapping. The method may further comprise the step of circulating the cold coolant through a third coolant flow path of the third adsorbent. This step of circulating the cold coolant through a third coolant flow path may occur during the adsorbing step.

In one embodiment, the evaporator is a first evaporator and the method further includes the step of, prior to providing cooled air to the interior of the vehicle, flowing the air proximal to a second evaporator, where the second evaporator is an element of a first sorption cooling system, the second evaporator is an element of a second sorption cooling system, and where the first and second sorption cooling systems are a portion of a multiple-stage sorption cooling system.

In another embodiment, the sorption cooling system of the present invention is utilized in conjunction with a cogeneration energy system to create a trigeneration energy system. The trigeneration energy system may be used to provide a cooled fluid to the interior of a building.

As will be appreciated, many of the noted aspects, embodiments and features discussed above may be implemented in any desired combination. Additional aspects and corresponding advantages of the present invention will become apparent to those skilled in the art in conjunction with the further description that follows.

BRIEF DESCRIPTION OF THE DRAWINGS

FIG. 15B is a side view of one embodiment of an adsorbent bed of the present invention.

DETAILED DESCRIPTION

The present invention provides an improved sorption cooling system that may include an improved, lightweight adsorbent bed structure capable of adsorbing a relatively high amount of refrigerant. The sorption cooling system may also include an improved lightweight, compact evaporator capable of evaporating refrigerant at rates sufficient to sustain cooling operations. The sorption cooling system may be used to provide cooled fluid, such as air or water, to vehicles or buildings.

Figure 1:
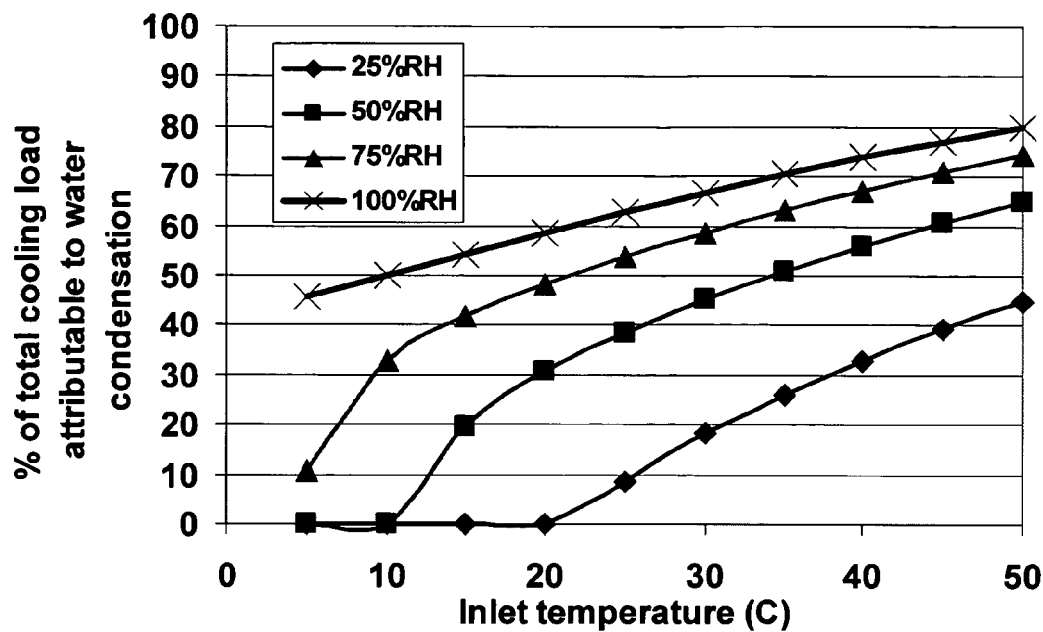
FIG. 1 is a graph depicting the relationship between cooling load, relative humidity and temperature of incoming air.
Figure 2:
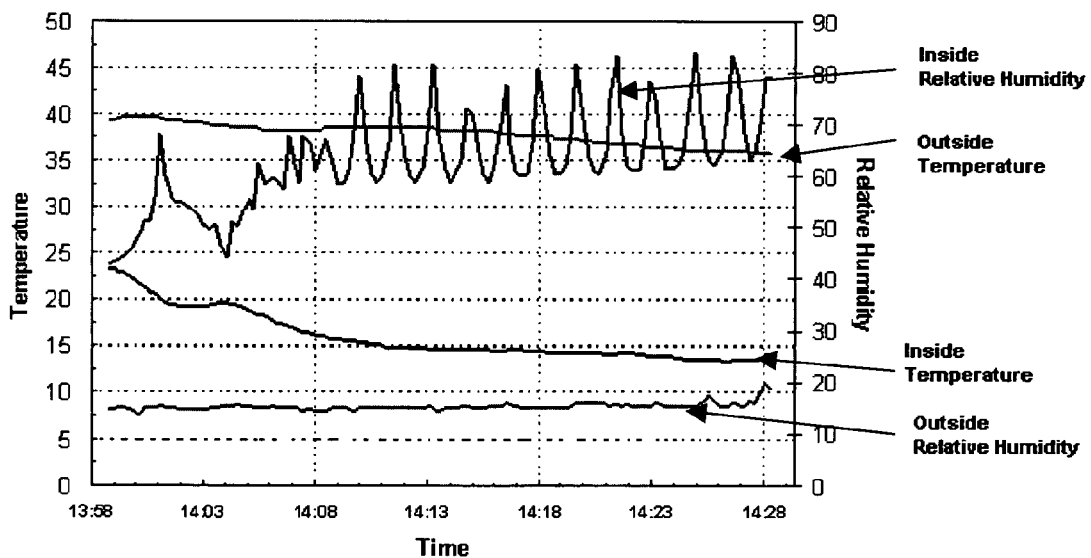
FIG. 2 is a graph depicting the cyclical operation of a traditional vapor-compression based air conditioner of vehicle.
Figure 3:
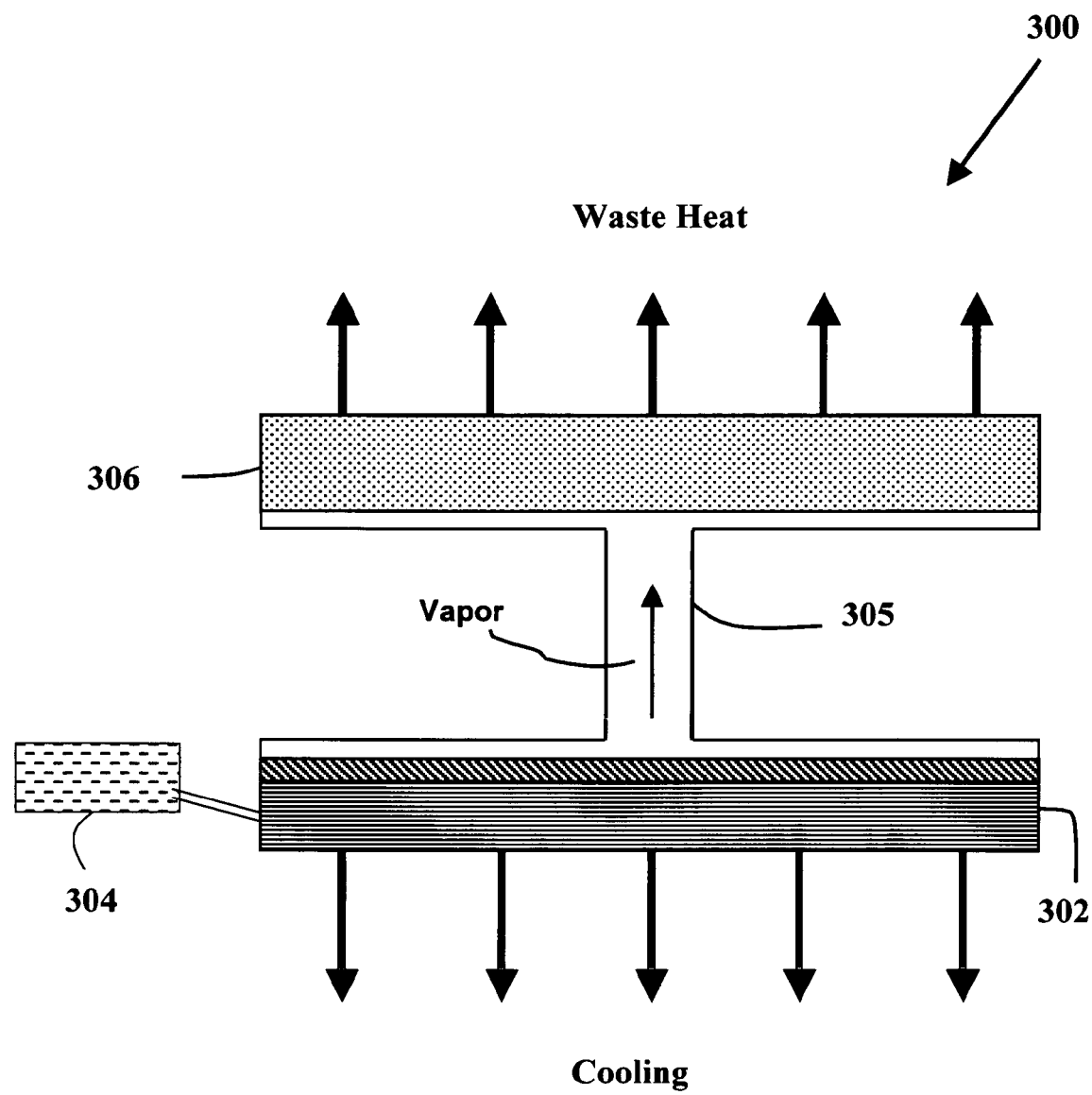
FIG. 3 is a cross-sectional view of a typical sorption cooling device.

The operation of a sorption cooling system is well known in the art. Generally, a sorption cooling system 300 comprises an evaporator 302, an adsorber 306 and a refrigerant source 304, as depicted in FIG. 3. Refrigerant supplied to the evaporator 302 from the refrigerant source 304 evaporates in the evaporator 302, thereby cooling a portion of the evaporator 302. The evaporated refrigerant is then adsorbed in the adsorber 306 to remove the vaporous refrigerant from the evaporator 302, thereby increasing its cooling capacity. A vapor passageway 305 enables the evaporated fluid to flow from the evaporator 302 to the adsorber 306.

The present invention enables the use of adsorption techniques to provide cooling using a solid-phase, high-capacity desiccant that is capable of adsorbing a significant amount of vapor-phase refrigerant and that is also capable of desorbing most or all adsorbed refrigerant at temperatures not greater than 120° C. during regeneration operations.

The mechanism by which the high-capacity desiccant functions can be adsorption, absorption or a combination of adsorption and absorption, and as used herein, the terms adsorb, adsorptive, adsorption and the like refer to the retention of fluid, regardless of the actual mechanism by which the fluid is retained. Likewise, the mechanism by which the adsorbent refrigerant is released from the high-capacity desiccant can be desorption, desorbtion, or a combination of desorption and desorbtion, and as used herein, the terms desorb, desorbtive, desorbtion and the like, as well as the terms regenerate, regenerable, regenerated and the like when used in reference to the desiccant material, refer to the release of fluid from the adsorbent, regardless of the actual mechanism by which the fluid is released.

Application of In Situ Regenerable and Ex-Situ Regenerable Sorption Cooling Systems Sorption cooling systems can generally be categorized into two types: in situ regenerable and ex situ regenerable. In situ regenerable sorption cooling systems are generally capable of regenerating the adsorbed refrigerant from the adsorbent bed during operation of the sorption cooling system, and therefore generally include a means for regenerating the adsorbed refrigerant and subsequently liquefying such refrigerant. Generally these means include a heat source for heating the adsorbent bed material and a cooling source for cooling the regenerated refrigerant into a liquid. Often, the cooling source is a condenser.

Ex situ regenerable sorption cooling systems are generally not capable of regenerating the adsorbed refrigerant from the adsorbent bed during operation of the sorption cooling system. Therefore, ex situ regenerable sorption cooling systems are not generally used in vehicle cooling applications.

Figure 4:
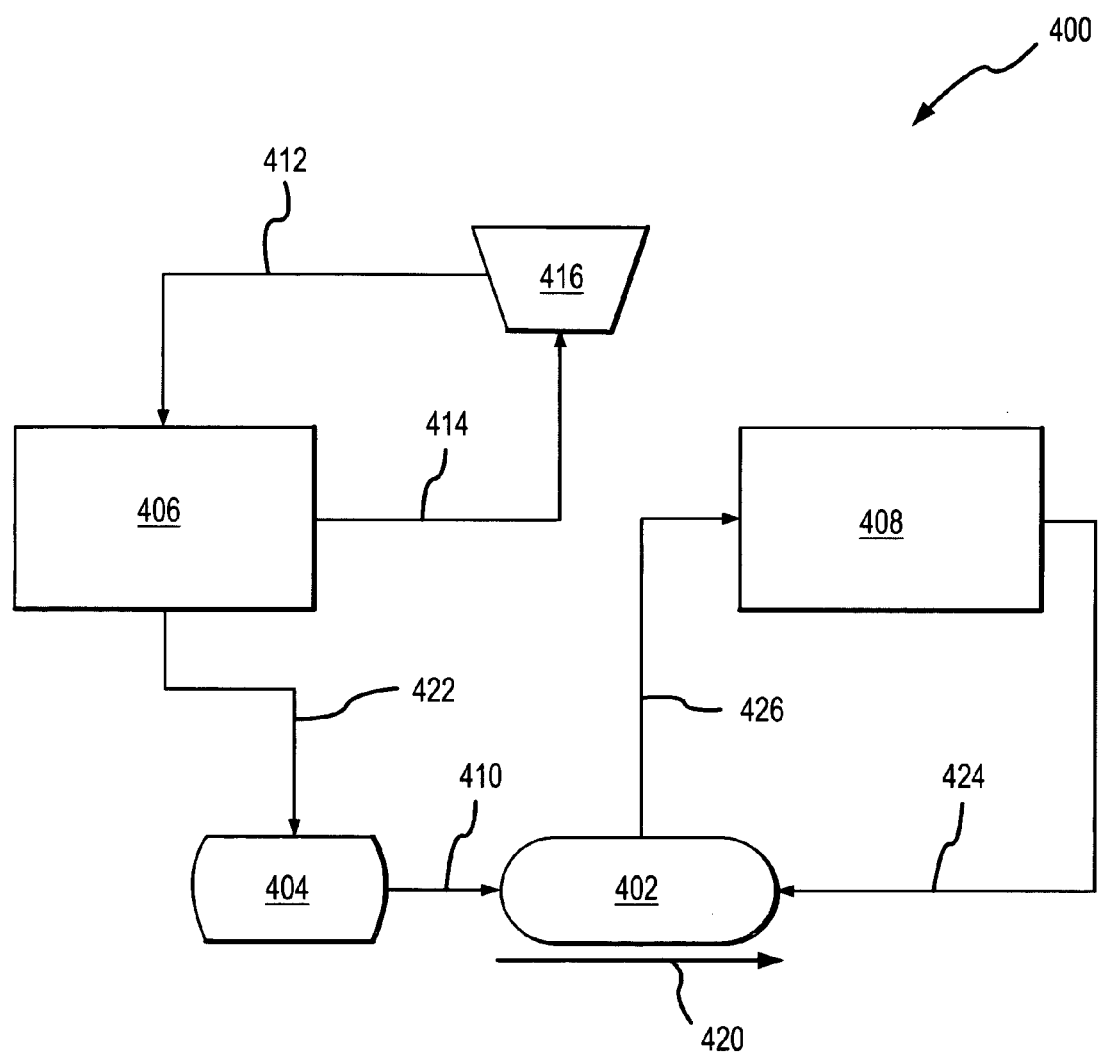
FIG. 4 is a flow diagram depicting one embodiment of a sorption cooling system of the present invention.
Figure 5:
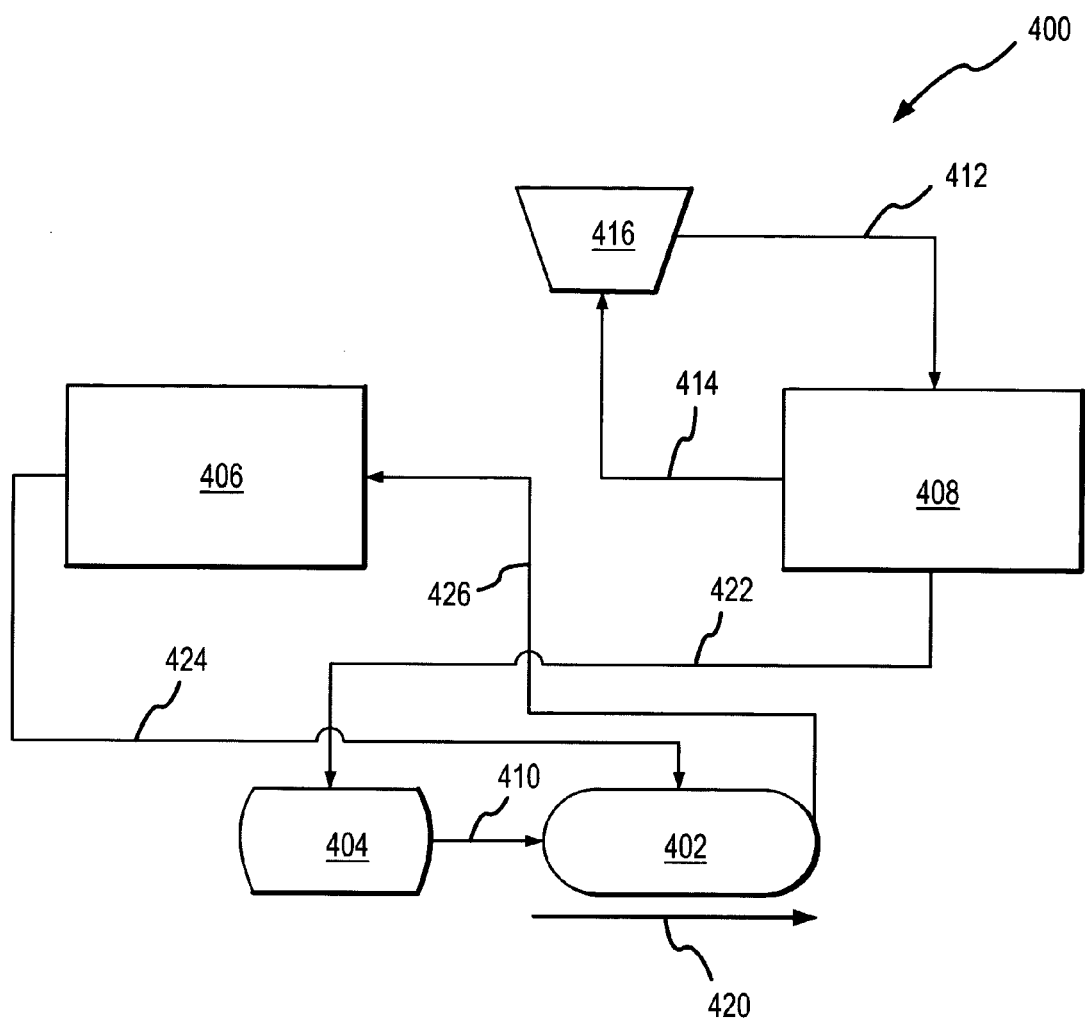
FIG. 5 is a flow diagram depicting one embodiment of a sorption cooling system of the present invention.

According to one aspect of the present invention, the sorption cooling system is an in situ sorption cooling system utilized in providing cooled air to the cabin of a vehicle. One embodiment of such a sorption cooling system is depicted in FIGS. 4–5. According to this embodiment, the sorption cooling system 400 includes an evaporator 402, a condenser 404 in fluid communication with the evaporator 402, a plurality of adsorbent beds 406, 408 adapted to fluidly communicate with the evaporator 402 and condenser 404, and a coolant source 416 for providing coolant to the adsorbent beds. During operation, liquid refrigerant flows from the condenser 404, via evaporator supply line 410, to the evaporator 402, where the refrigerant is evaporated. As is well known in the art, this evaporation cools the evaporator 402. The evaporator 402 is situated such that at least one surface is in thermal communication with the air 420 to be supplied to the interior of a vehicle, thereby cooling such air.

The adsorbent beds 406, 408 generally work in parallel and in two operating phases to enable continuous cooling operations. In the first phase of operation, as depicted in FIG. 4, a first adsorbent bed 406 is heated by circulating hot (relatively) coolant fluid through the first adsorbent bed 406 via a coolant flow path, discussed further below. The hot coolant fluid is circulated through the first adsorbent bed 406, and is supplied from coolant source 416 via coolant supply line 412. Hot coolant is returned to the coolant source via coolant return line 414. The heated first adsorbent bed 406 desorbs its adsorbed refrigerant, which is then supplied to the condenser 404 via condenser supply line 422 where it is liquefied. The liquid refrigerant can then be provided to the evaporator 402 via evaporator supply line 410 to sustain cooling operations. Also during the first phase of operation, the second adsorbent bed 408 supplies "dry air" to the evaporator 402 via air supply line 424, such as by a fan (not depicted). The dry air stream helps evaporate refrigerant, and exits the evaporator 402 as a "wet air" stream, where it is returned to the second adsorbent bed 408 via air return line 426. The returned wet air stream flows through the second adsorbent bed 408 via a refrigerant flow path, discussed further below, where refrigerant contained in the wet air stream is adsorbed within the second adsorbent bed 408, such as by a desiccant. Pipes, tubing, valves and the like may be used to control the flow of fluid in the system.

As used herein, the term "dry air" refers to an air or other gaseous stream containing a relatively small amount or no refrigerant. As used herein, the term "wet air" refers to an air or other gaseous stream containing a relatively high or even saturated amount of refrigerant. As noted below, a variety of refrigerants can be used within the sorption cooling system of the present invention, including water. However, neither the term "dry air" nor the term "wet air" is meant to imply the absence or presence of water within such air unless the refrigerant comprises water.

The first phase of operation continues until the efficiency of adsorption by the second adsorbent bed 408 reaches a threshold level of adsorption and/or the first adsorbent bed 406 is sufficiently regenerated (i.e., a predetermined amount of refrigerant is removed from the first adsorbent bed), after which the first phase of operation is ceased and the second phase of operation begins, such as by switching valves and/or other mechanisms within the system. In the second phase of operation, the roles of the first and second adsorbent beds 406, 408 are switched, where the first adsorbent bed 406 supplies dry air to the evaporator and the second adsorbent bed 408 is regenerated and supplies refrigerant to the condenser 404, as depicted in FIG. 5. This enables continuous operation of the sorption cooling system 400.

Generally, the adsorbent beds are structured to contain distinct refrigerant and coolant flow paths, as is discussed in further detail below. Generally, the refrigerant and coolant flow paths are fluidly isolated. The refrigerant flow path generally allows a fluid (e.g., a gas) to flow through the adsorbent bed and contact the desiccant material. The coolant flow path is fluidly isolated from the desiccant material of the adsorbent beds and refrigerant flow path, but is adjacent to such desiccant material for providing thermal communication thereto, as discussed in further detail below.

For convenience, the term "desiccant", "desiccant material" and the like are used herein to described the adsorbent material utilized in the adsorber, but such terms are not limited to limit the adsorbent material to just desiccants. The adsorbent can be any material. capable of adsorbing vaporous refrigerant and that is also capable of regenerating (i.e., desorbing) refrigerant at temperatures not greater than 120° C.

The sorption cooling system is preferably a closed-loop system. Preferably, the sorption cooling system is contained in a hermetically sealed system to maintain refrigerant to adsorbent ratios and to effect the desired cooling, as well as to prevent contamination of the high-capacity adsorbent. For example, if a high-capacity desiccant is used in the adsorber, it cannot be exposed to atmospheric conditions where water vapor and contaminants are present. Exposure to the atmosphere will likely poison and/or sterilize the high-capacity desiccant.

As noted above, hot coolant can be supplied to the adsorbent beds to regenerate the refrigerant contained therein. In one preferred embodiment, the hot coolant is a liquid-phase coolant. In a particularly preferred embodiment, the hot coolant is a liquid-phase coolant used in the cooling operations of an internal combustion engine, such as radiator coolant fluid (e.g., ethylene glycol), and the coolant source is the radiator or similar structure of a vehicle. Using waste heat from the engine via the liquid coolant enables the regeneration of the adsorbent bed without supplying a secondary heat source, and provides efficiency in operating the engine as well as the sorption cooling system. Moreover, the use of a hot liquid-phase coolant, as opposed to gas-phase coolant, is more efficient in regenerating the adsorbent bed, as the hot liquid-phase coolant will, in general, more quickly transfer its heat to the bed.

Figure 6:
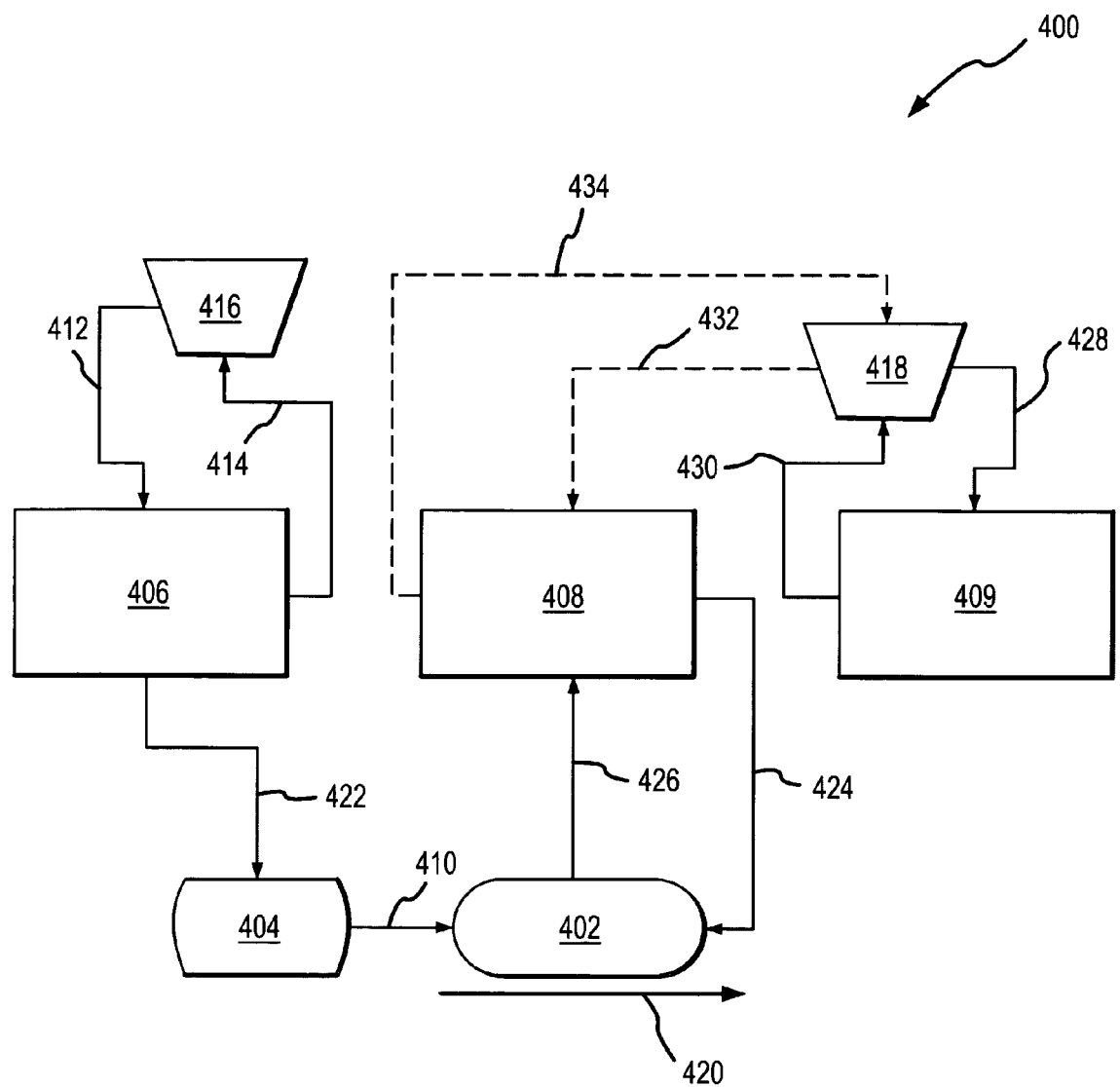
FIG. 6 is a flow diagram depicting one embodiment of a sorption cooling system of the present invention.

According to another aspect of the present invention, the sorption cooling system includes a second coolant source for use in cooling the adsorbent beds. One embodiment utilizing such a second coolant source is depicted in FIG. 6. According to this embodiment, the second coolant source 418 may be plumbed to the adsorbent beds 406, 408, 409 to provide a cold coolant (as opposed to the hot coolant of the first coolant source) to help cool the adsorbent beds 406, 408, 409 during a cool-off phase and/or help increase the adsorption capacity of the desiccant during adsorption activity.

As noted above, the adsorbent beds are generally regenerated by heating the adsorbent material contained therein. After regeneration, the desiccant material should generally be allowed to return to a certain temperature before beginning adsorption activities. A significant amount of time can elapse between regeneration activities and the time at which the desiccant has returned to the certain temperature. This time lapse can affect the effiency of operation of the sorption cooling system. Thus, it is often desirable to provide a third operating phase where a cold coolant is supplied to an adsorbent bed after its regeneration operation to more quickly reduce its temperature to an acceptable level. Therefore, according to one embodiment of the present invention, a second coolant source 418 is provided, which can provide a cold (relatively) coolant to an adsorbent bed during its third operating phase (cool-off). As depicted in FIG. 6, a first adsorbent bed 406 is operating in a regeneration phase, and is being heated by a hot coolant from a first coolant source 416, as described above. A second adsorbent bed 408 is operating in an adsorption phase, as described above. A cold coolant circulates through a third adsorbent bed 409 via coolant supply and return lines 428, 430 to cool the third adsorbent bed 409.

The cold coolant may also be supplied to an adsorbent bed conducting adsorption operations. Generally, the adsorption capacity of the desiccant is a function of its temperature; at lower temperatures the desiccant is capable of adsorbing more refrigerant. As depicted in FIG. 6, the cold coolant can circulate through the second adsorbent bed 408 via coolant supply and return lines 432, 434, to increase the adsorption capacity of the second adsorbent bed 408 and, therefore, the efficiency of the sorption cooling system.

As used herein, the terms "hot coolant" and "cold coolant" refers to the temperature of the coolant in relation to the temperature of the adsorbent beds, and more specifically to the temperature of the desiccant sheets within such beds. Thus, a hot coolant is generally at a temperature greater than that of the desiccant materials and a cold coolant is at a temperature less than that of the desiccant materials.

The cold coolant may be any fluid adapted to flow through the coolant flow paths of the adsorbent bed. In one embodiment, the cold coolant is a gas, such as ambient air. According to another embodiment the cold coolant is a liquid coolant. In one embodiment, the second cooling source includes a second radiator (in addition to the one normally employed by the vehicle for engine block cooling), which comprises the liquid cold coolant. The size of the second cooling source depends on the quantity of heat that must be removed, which depends upon the adsorber's thermal mass. As will be appreciated, since a high-capacity desiccant is generally employed according to the present invention, the adsorber's thermal mass will be greatly reduced, and a relatively small second coolant source can be employed to achieve to achieve the necessary cooling rates. In another embodiment, the second coolant source is the condenser and the cold coolant is refrigerant contained within the condenser. Also, while FIG. 6 depicts separate supply and return lines for the hot and cold coolant paths, the cold coolant generally uses the same coolant piping used by the hot coolant and a series of valves and tees are used to effect the appropriate flows.

In another embodiment of the present invention, the sorption cooling system is operated in conjunction with a conventional (i.e., compression-based) air-conditioner to supplement vehicle cooling requirements. In one embodiment of the present invention, a relatively smaller-sized air-conditioner is provided in a vehicle for normal use. When high temperatures and/or high humidity are encountered, a sorption cooling system of the present invention can be used to provide the necessary additional cooling capacity to achieve cooling of the interior of the vehicle. According to this embodiment, adsorbent beds employing the high-capacity desiccant may also optionally be used to dehumidify the incoming air to decrease the cooling load.

In another embodiment, two or more sorption cooling systems are operated in parallel to provide the necessary cooling capacity. Each sorption cooling system is fluidly isolated from the others and can operate independently.

Figure 7:
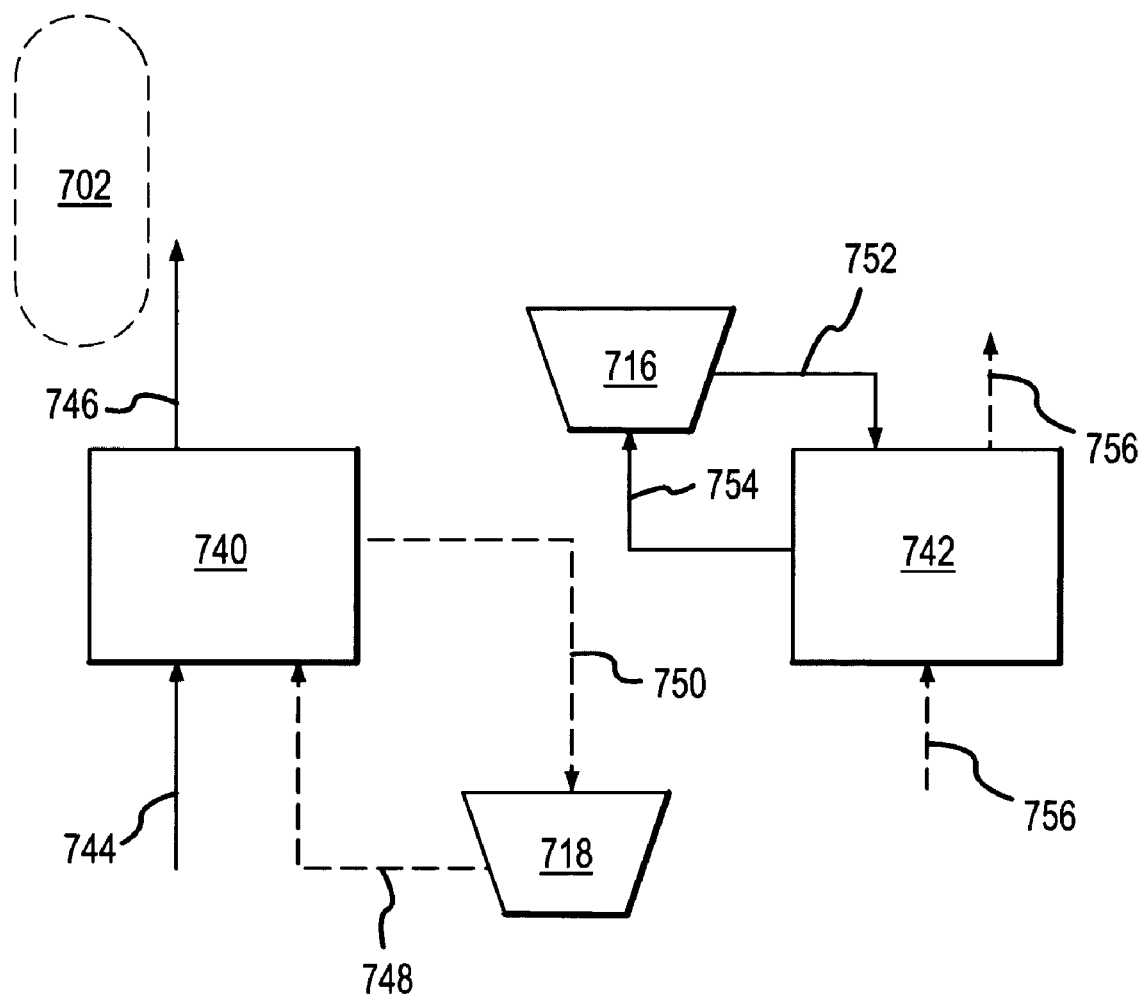
FIG. 7 is a flow diagram depicting one embodiment of a dehumidification system of the present invention.

According to yet another embodiment, adsorbent beds are used to dry incoming cabin air to reduce the cooling load on the sorption cooling system. As illustrated in FIG. 7, adsorbers 740, 742 are operated in parallel to achieve continuous drying of the incoming air to be cooled by the sorption cooling system of the present invention. Incoming air 744 flows through a first adsorbent bed 740 where it is dried (e.g., via a high capacity desiccant) and exits as dehumidified air 746, which is subsequently flowed proximal to and/or in contact with the evaporator 702 of the present invention. Concurrently, a second adsorbent bed 742 is regenerated by heating the bed, such as by using a coolant source 716, as described above, and flowing a gas 756 through the second adsorbent bed 742 to remove desorbed water from the bed 742. Once the first adsorbent bed 740 has reached a threshold level of adsorption and/or the second adsorbent bed 742 has been sufficiently regenerated, the adsorbent beds 740, 742 switch dehumidification and regeneration operations. The adsorbent beds 740, 742 may optionally also employ the use of a second coolant source 718, as described above, to cool such adsorbers during operation, thereby increasing their adsorption capacity. Valve, piping and other materials (not shown) may be used to effect appropriate flows through the adsorbers.

According to another embodiment of the present invention, an in situ regenerable sorption cooling system is used to provide a cooled fluid to a building. Waste heat from a cogeneration plant, or other heat source, is used to provide heat to adsorbent beds of a sorption cooling system of the present invention. Just as described above with respect to providing cooled air to the cabin of a vehicle, a series of adsorbent beds are operated in parallel to enable the sorption cooling system to provide continuous cooling. However, instead of using a hot coolant from a vehicle, a hot liquid or gas, such as hot water or steam from a cogeneration system, may be circulated through the various adsorbent beds to provide the heat necessary to regenerate such beds. The below-described refrigerants, adsorbent beds and evaporators may be used according to this embodiment. Also, a multiple-chamber evaporator may be used to provide a cooled fluid to a building, such as the multiple-chamber evaporator described in commonly-owned U.S. Provisional Patent Application No. 60/688,599, entitled "SORPTION COOLING SYSTEMS, THEIR USE IN PERSONAL COOLING APPLICATIONS AND METHODS RELATING TO SAME" and filed on Jun. 8, 2005, which is incorporated herein by reference in its entirety.

The Refrigerant Source of the Sorption Cooling System

As noted above, the refrigerant source supplies the evaporator with the necessary refrigerant to provide the cooling. Generally, ex situ regenerable sorption cooling systems can use any type of refrigerant source, but a simple liquid reservoir, such as a lightweight, flexible plastic housing, will generally suffice so as to minimize the size, weight and complexity of the system. Other types of liquid reservoirs useful in accordance with the present invention are disclosed in commonly-owned U.S. Pat. No. 6,701,724 to Smith et al. and U.S. Pat. No. 6,858,068 Smith et al., each of which is incorporated herein by reference in its entirety.

In situ regenerable sorption cooling systems generally are more complex as they require further plumbing to enable fluid communication between the adsorbent beds and the refrigerant source and a means to liquefy the vaporous refrigerant. For vehicle cooling applications, an air-cooled condenser is suitable because of its relatively small size and weight, but a water-cooled or an evaporative condenser may also be employed.

The Refrigerant of the Sorption Cooling System

Any suitable refrigerant may be employed in the sorption cooling system of the present invention. In one embodiment, the refrigerant has a high vapor pressure at ambient temperature so that a reduction of pressure will produce a high vapor production rate. Suitable liquids include ammonia, various alcohols such as methyl alcohol or ethyl alcohol, ketones (e.g., acetone) or aldehydes (e.g., acetaldehyde). Other useful liquids can include chlorofluorocarbons (CFC) or hydrochlorofluorocarbons (HCFC) such as FREON (E.I. Dupont de Nemours, Wilmington, Del.), a series of fluorocarbon products such as FREON C318, FREON 114, FREON 21, FREON 11, FREON 114B2, FREON 113 and FREON 112.

In one preferred embodiment, the refrigerant is an aqueous-based liquid and in a particularly preferred embodiment the liquid consists essentially of water. Water is preferred for its very high mass heat of vaporization in addition to its environmental, cost and safety advantages. Approximately 2,500 J of cooling per gram of water evaporated at ambient temperature can be achieved.

The Adsorbent Bed of the Sorption Cooling System

Figure 8:
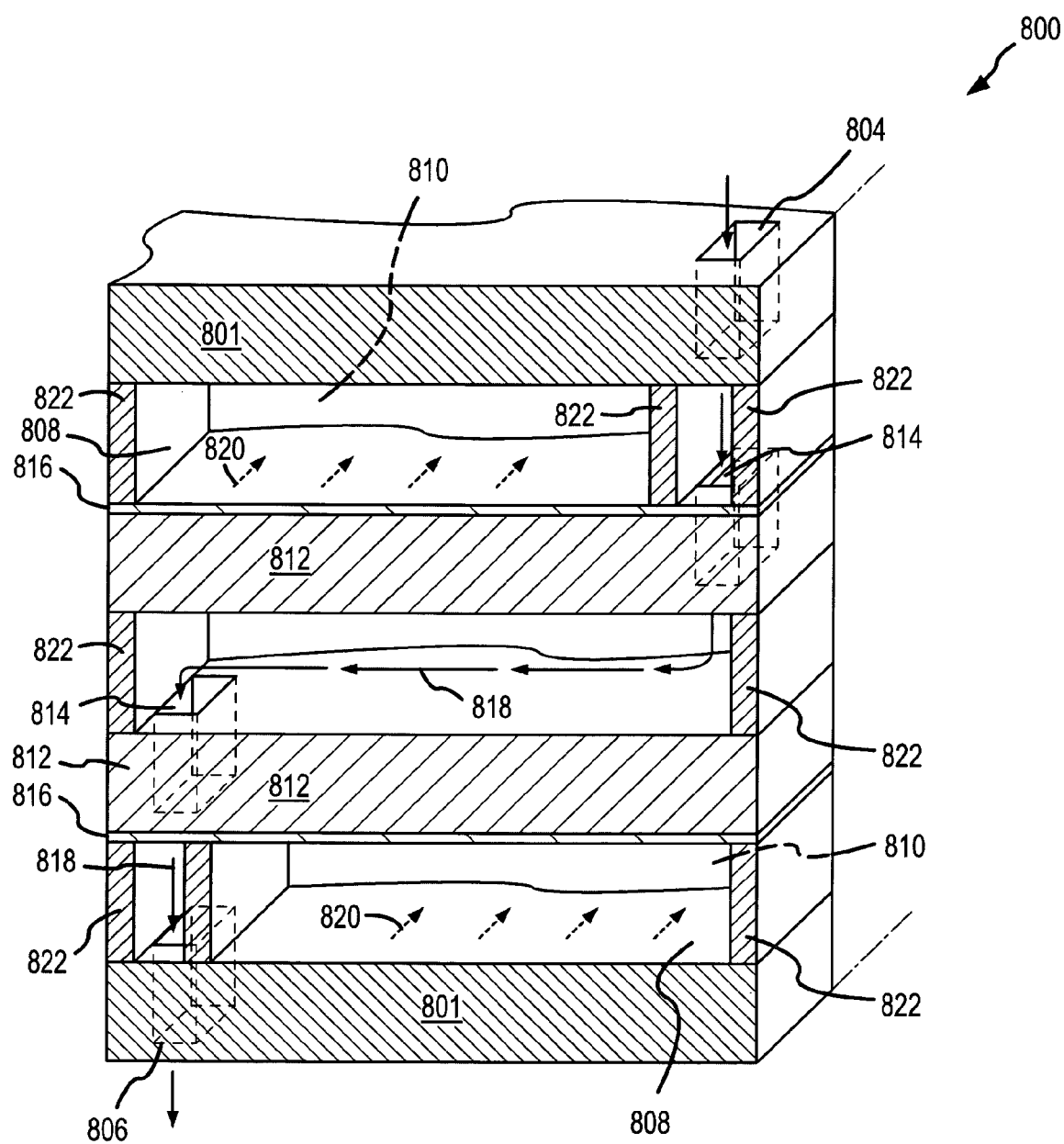
FIG. 8 is a cross-sectional, perspective view of one embodiment of an adsorbent bed of the present invention.

The adsorber of the sorption cooling system of the present invention may be any type of adsorber adapted to adsorb refrigerant from the evaporator. For example, the adsorber may be in the form of a wheel (stationary or rotating) a packed bed, sheet, spiral-wound, or meso-channel parallel plate contactors. In a preferred embodiment, the adsorber is an adsorbent bed that is lightweight, compact and has a relatively high adsorption capacity. The adsorbent bed is also preferably capable of quickly adsorbing and desorbing refrigerant during adsorption and regeneration operations, respectively. One embodiment of such an adsorbent bed is depicted in FIG. 8.

Figure 9:
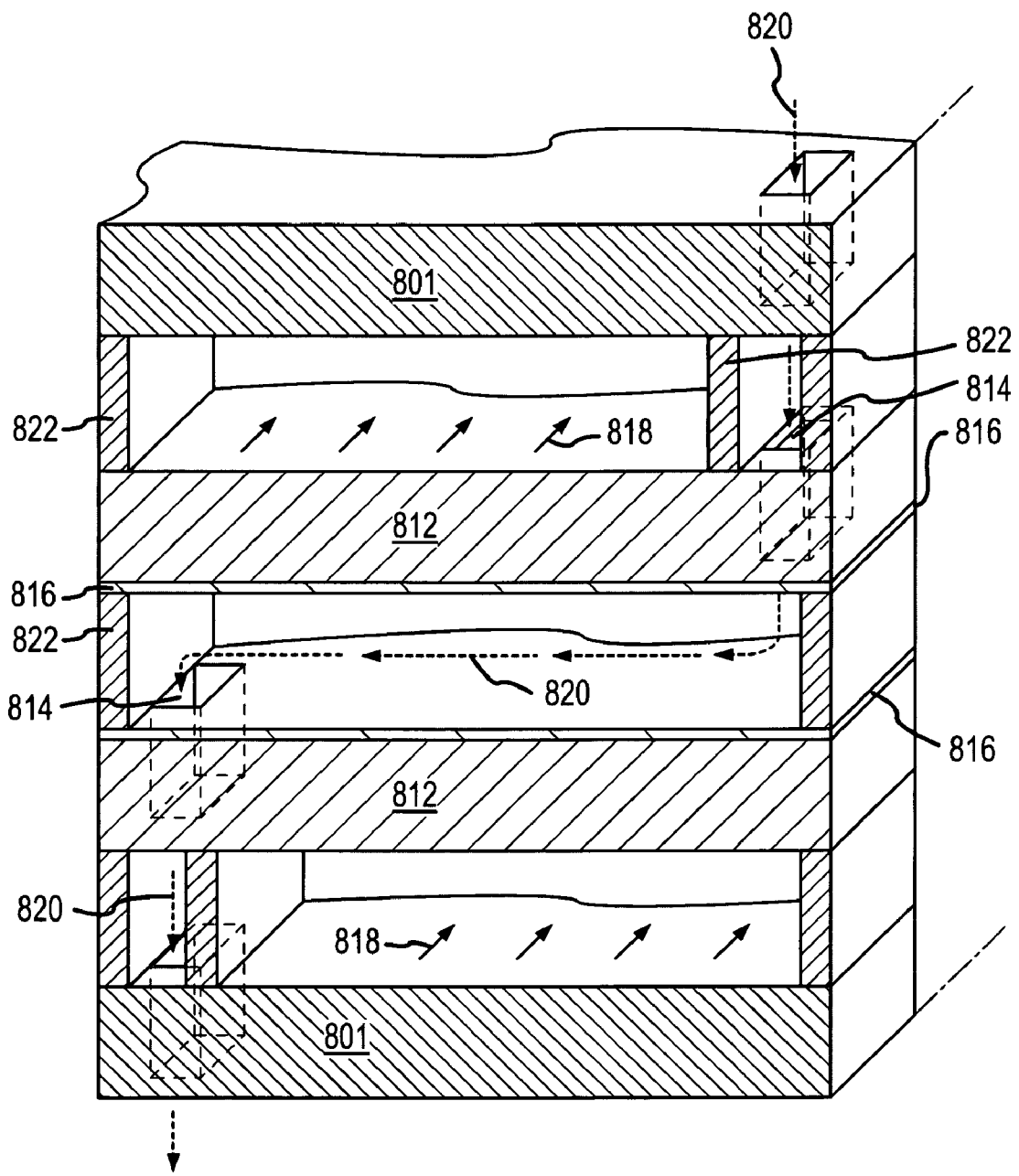
FIG. 9 is a cross-sectional, perspective view of one embodiment of an adsorbent bed of the present invention.

In this embodiment, the adsorbent bed 800 includes a fluid impermeable outer casing 801 including a refrigerant inlet 804, a refrigerant outlet 806, coolant inlets 808 and coolant outlets 810. A plurality of desiccant sheets 812 are disposed within the casing, each of the desiccant sheets having at least one aperture 814 extending therethrough. A first side of the desiccant sheets 812 preferably includes a high-capacity desiccant. A second side of the desiccant sheets preferably is covered by a fluid impermeable barrier 816. A refrigerant flow path 818 lies between the refrigerant inlet 804 and refrigerant outlet 806, and a coolant flow path 820 lies between the coolant inlet 808 and coolant outlet 810. Spacing materials 822 separate the desiccant sheets 812 from one another and help to define the refrigerant and coolant flow paths. The spacing materials 822 and apertures 814 of the desiccant sheets are arranged such that the refrigerant flow path 818 and coolant flow path 820 are fluidly isolated from one another. Generally, the apertures 814 are a portion of and help define either the refrigerant or coolant flow path, although a first set of apertures can be used to define the refrigerant flow path, while a second set of apertures can be used to define the coolant flow path. It will be appreciated that the adsorbent bed can be designed such that the flow paths depicted in FIG. 8 are switched by switching the coolant inlets and outlets with the refrigerant inlets and outlets and flipping the desiccant sheets over, as depicted in FIG. 9.

During adsorption operations, vaporous refrigerant from the evaporator flows through the refrigerant flow path 818 contacting the adsorbent sections of the desiccant sheets 812, where the refrigerant is adsorbed. As discussed above, during adsorbent operations a cold coolant may be circulated through the coolant flow paths 820 to cool the desiccant sheets and increase their adsorption capacity. The fluid impermeable barrier 816 on the second side of the desiccant sheets prevents unwanted interaction (e.g., chemical interaction) between the cold coolant and the desiccant.

During regeneration operations, a hot coolant, such as liquid coolant used in the cooling of an internal combustion engine, flows through the coolant flow paths 820 to heat the desiccant, increasing the vapor pressure of the refrigerant adsorbent thereon, eventually desorbing at least a portion of, if not all, the refrigerant from the desiccant. The fluid impermeable barrier 816 on the second side of the desiccant sheets 812 prevents unwanted interaction between the hot coolant and the desiccant sheets. Dry air from the condenser or other refrigerant source flows through the refrigerant flow paths 818, to remove the desorbed refrigerant. Wet air exits the adsorbent bed 800, and in the case of in situ regenerable sorption cooling systems, is returned to the condenser where it is liquefied.

Figure 10A:
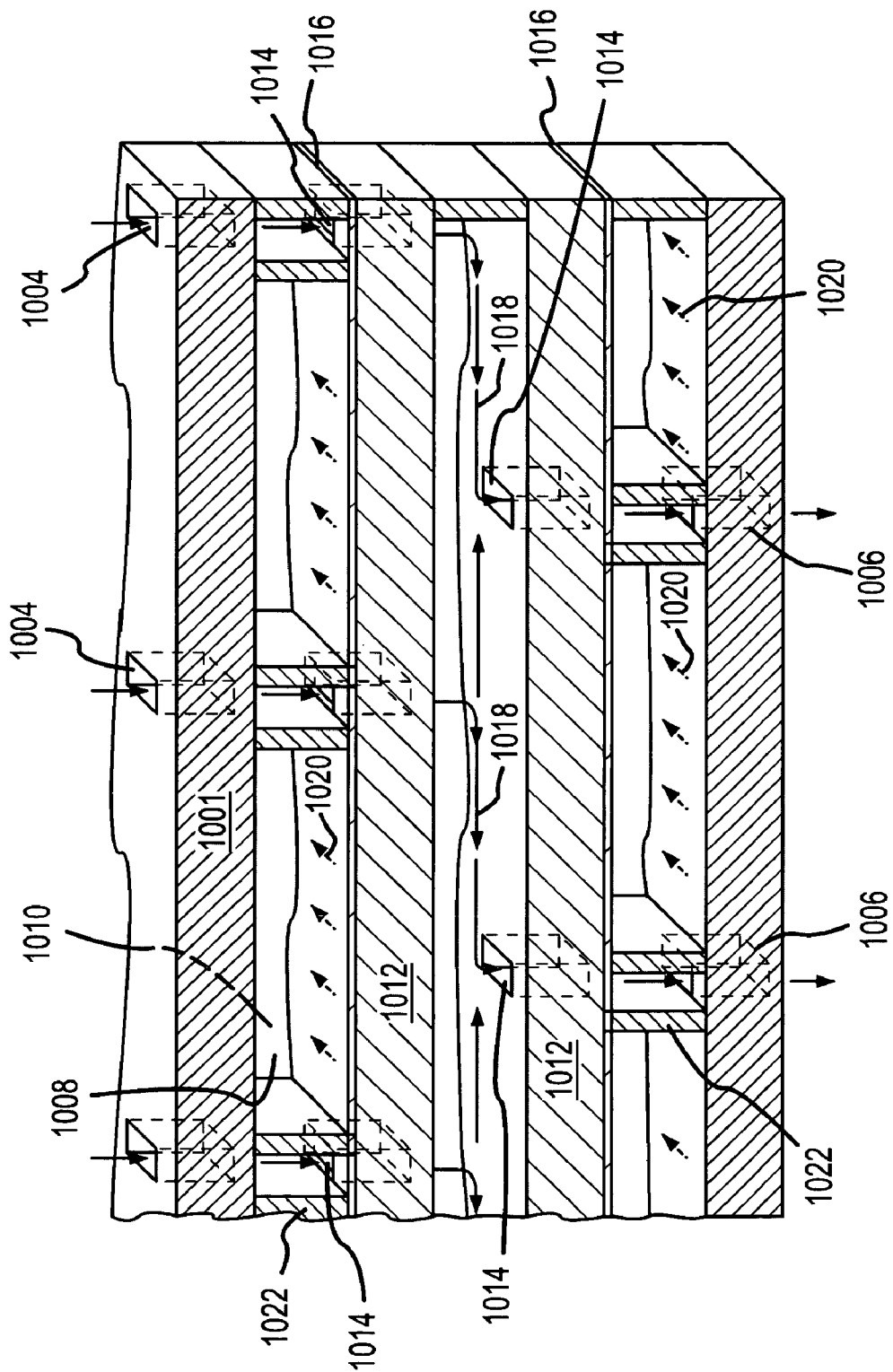
FIG. 10A is a cross-sectional, perspective view of one embodiment of an adsorbent bed of the present invention.
Figure 10E:
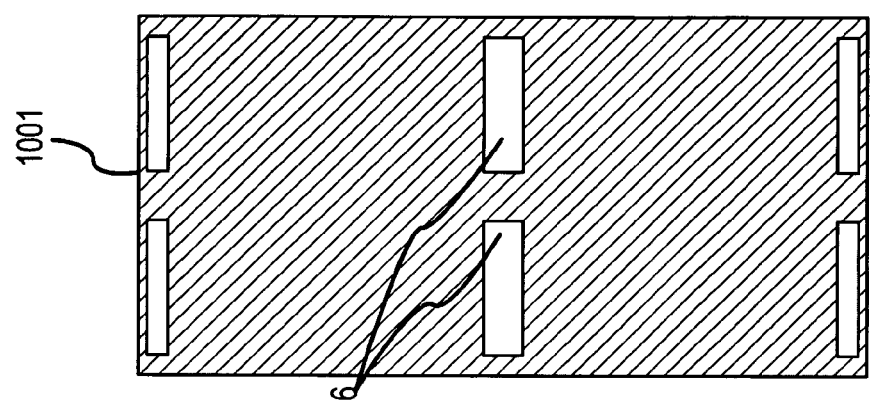
FIG. 10E is a top view of one embodiment of a portion of a fluid casing of an adsorbent bed of the present invention.
Figure 10D:
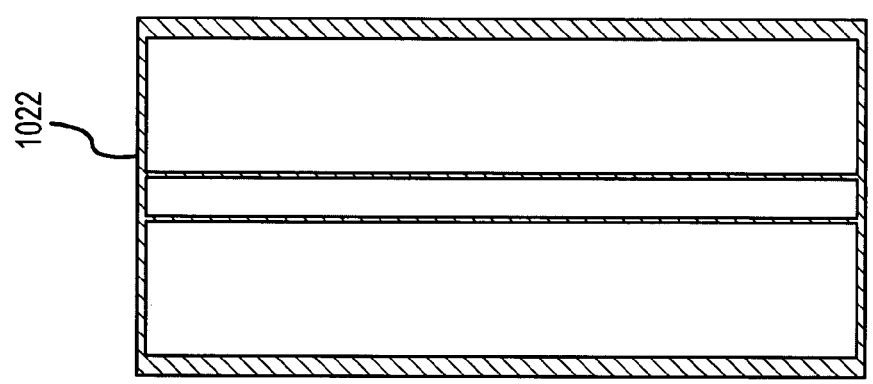
FIG. 10D is a top view of one embodiment of a spacing material of an adsorbent bed of the present invention.
Figure 10C:
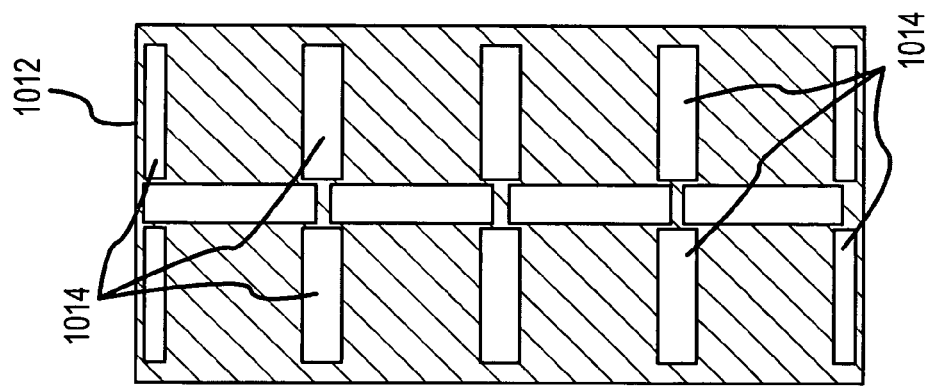
FIG. 10C is a top view of one embodiment of a desiccant sheet of an adsorbent bed of the present invention.
Figure 10B:
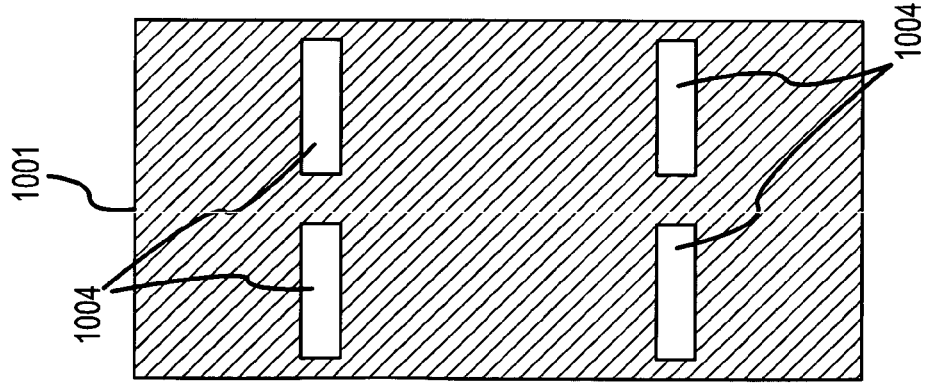
FIG. 10B is a top view of one embodiment of a portion of a fluid casing of an adsorbent bed of the present invention.

While a single refrigerant and/or coolant flow path may be used in accordance within the present invention, generally the adsorbent bed will include a plurality of apertures per desiccant sheet, and a plurality of spacers, coolant inlets and outlets and/or refrigerant inlets and outlets to define a plurality of refrigerant and coolant flow paths. One embodiment of such an adsorbent bed is provided in FIGS. 10A–10E. A fluid impermeable casing 1001 includes a plurality of refrigerant inlets 1004, refrigerant outlets 1006, coolant inlets 1008 and coolant outlets 1010. A plurality of desiccant sheets 1012 are disposed within the casing, each of the desiccant sheets having at least one aperture 1014 extending therethrough. A first side of the desiccant sheets preferably includes a high-capacity desiccant. A second side of the desiccant sheets preferably is covered by a fluid impermeable barrier 1016. A plurality of refrigerant flow paths 1018 lie between the refrigerant inlets 1004 and refrigerant outlets 1006, and a plurality of coolant flow paths 1020 lie between the coolant inlets 1008 and coolant outlets 1010. Spacing materials 1022 separate the desiccant sheets 1012 from one another and help to define the plurality of refrigerant flow paths 1018 and plurality of coolant flow paths 1020. The spacing materials 1022 and apertures 1014 of the desiccant sheets 1012 are arranged such that the refrigerant flow paths 1018 and coolant flow paths 1020 are fluidly isolated from one another. Generally, the apertures 1014 are a portion of and help define the flow path of either the refrigerant or coolant flow paths, although a first set of apertures can be used to define the refrigerant flow paths and a second set of apertures can be used to define the coolant flow paths. It will be appreciated that the adsorbent bed can be designed such that the flow paths depicted in FIG. 10A are switched by switching the coolant inlets and outlets with the refrigerant inlets and outlets and flipping the desiccant sheets over.

The refrigerant flow paths should generally be designed to maximize mass transfer rates of refrigerant during adsorption and regeneration operations. As is discussed in further detail below, mass transfer rates can be maximized by optimizing, inter alia, the surface area of the adsorbent sections of the desiccant sheets (i.e., the surface area of the first, adsorbent sides of the desiccant sheets minus the area occupied by apertures) and the spacing between the adsorbent sides of the desiccant sheets.

The coolant flow paths should generally be designed to maximize heat transfer rates between the desiccant sheets and the coolant fluid. As is discussed in further detail below, coolant rates can be maximized by optimizing, inter alia, the surface area of available for heat transfer and the spacing between the fluid impermeable sides of the desiccant sheets.

As noted above, the sorption cooling system may also employ a cooling cycle/phase where the adsorbent bed is neither adsorbing nor regenerating refrigerant. During cooling operations, a cold coolant may be flowed through the coolant flow path to more quickly cool the desiccant sheets. The fluid impermeable barrier on the second side of the adsorbent sheets prevents unwanted chemical interaction between the cold coolant and the desiccant sheets. As will be appreciated, the valves and piping of the sorption cooling system should be arranged and positioned to enable the above cooling operations.

The casing of the adsorbent bed is preferably made of a rigid, lightweight and fluid impermeable material to help minimize the mass of the bed, prevent atmospheric interaction with the bed and structurally protect the bed. Non-rigid, fluid-impermeable materials can also be used in some instances. Suitable casing materials include simple plastic films such as polyethylene, nylon, PVC, metal foils with plastic heat seal layers such as sold those by Toyo Aluminum (Japan), metallized plastic barriers, such as those available from E.I. Du Pont de Nemours and Co. (Wilmington, Del., United States of America), molded polyethylene or polypropylene, such as those available from Rexam (Evansville, Ind., United States of America), COVEXX from Wipak (Finland), multilayer plastic, metals, thermoplastics, thermoset plastics and combinations thereof.

The spacing materials used in the adsorbent bed are preferably lightweight, rigid and include a fluid-impermeable perimeter. As the spacing materials are used to help define at least one of the refrigerant and coolant flow paths, and often both of such flow paths, the spacing materials are also preferably inert to both the refrigerant and coolant used in the sorption cooling system. Preferred spacer materials include polyethylenes, polycarbonates, polypropylenes, acrylonitrile-butadiene-styrene, polyoxymethylenes (e.g., DELRIN available from E.I. Du Pont de Nemours and Co.), polyvinyl chlorides, chlorinated polyvinyl chlorides, epoxies, thermoset polyester elastomers (e.g., HYTREL available from E.I. Du Pont de Nemours and Co.), polyphenylene ethers (e.g., NORYL available from General Electric Corp., Fairfield, Conn., United States of America), polyamides (e.g., NYLON available from E.I. Du Pont de Nemours and Co.), polyphenylene sulfides (e.g., RYTON available from Chevron Phillips Chemical Company, The Woodlands, Tex., United States of America), polytetrafluoroethylenes (e.g., TEFLON available from E.I. Du Pont de Nemours and Co.), polyvinylidine difluorides and combinations thereof. Of these, polyethylenes and polypropylenes are particularly preferred spacer materials. In some instances, the desiccant sheet material can also be cut to the size of the desired spacing material and utilized as the spacing material.

The desiccant sheets of the adsorbent bed are preferably lightweight, thin, have a high adsorption capacity and are adapted to be regenerated at a relatively low temperature. One preferred desiccant sheet according to the present invention includes a low-cost, high-capacity desiccant material, such as composite desiccant comprising a porous-support material having a high pore volume, controlled pore size and an adsorbent dispersed onto the porous support material, such as those desiccants described in commonly-owned U.S. Pat. No. 6,559,096 to Smith et al., which is incorporated by reference herein in its entirety.

Figure 11:
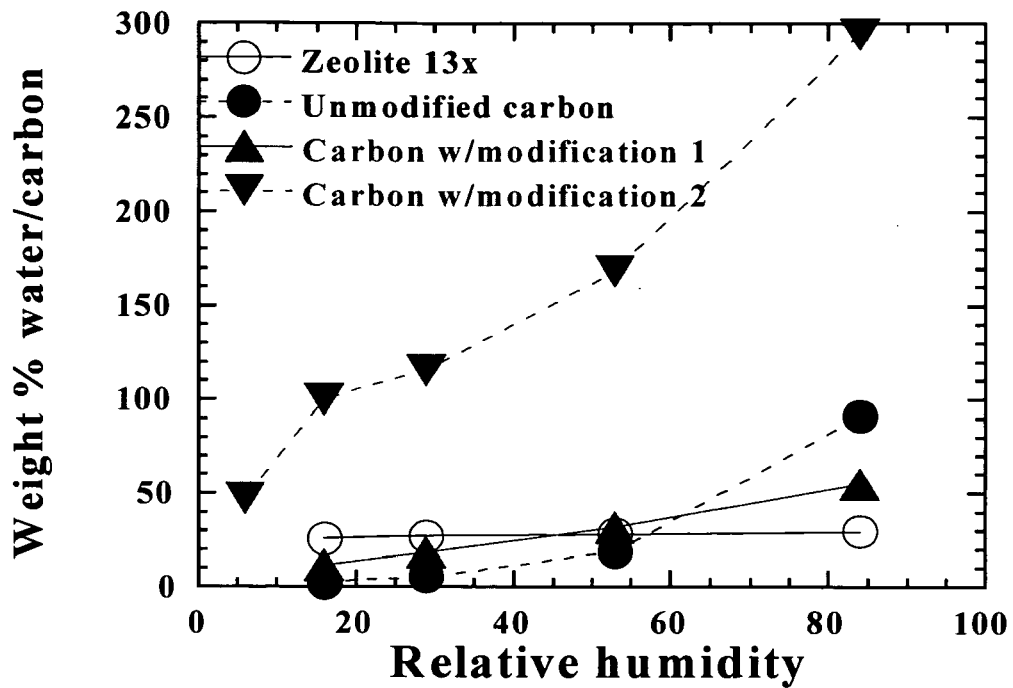
FIG. 11 is a graph depicting the adsorption capacities of various materials.
Figure 12:
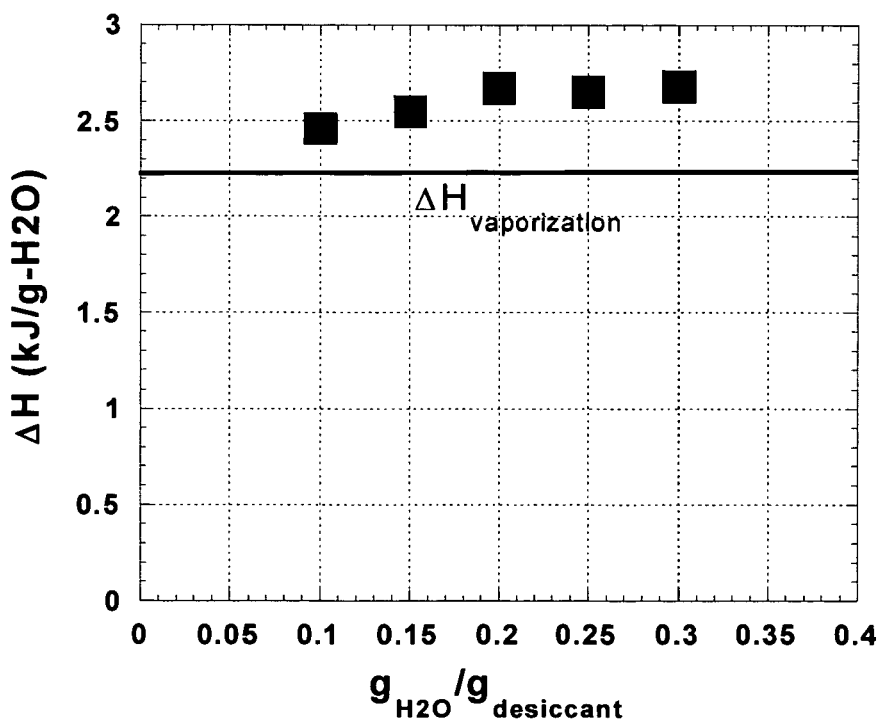
FIG. 12 is a graph depicting the heat of adsorption as compared to water heat of vaporization of a high-capacity desiccant.

The high-capacity desiccant is preferably capable of adsorbing at least about 0.2 grams of liquid refrigerant per gram of desiccant, preferably at least about 0.5 grams of liquid refrigerant per gram of desiccant, more preferably at least about 1.0 grams of liquid refrigerant per gram of desiccant, and even more preferably at least about 2.0 grams of liquid refrigerant per gram of desiccant. FIG. 11 illustrates typical adsorbent capacities of the high-capacity desiccant in comparison with other adsorbents. The high-capacity desiccant also preferably has a relatively low ratio of heat of vaporization to heat of adsorption, such as less than 1:1.5, preferably less than 1:1.4, and more preferably less than 1:1.3. By way of comparison, a typical zeolite has a heat of vaporization to heat of adsorption ratio of about 1:1.8. FIG. 12 illustrates the heat of adsorption as compared to water heat of vaporization of a high-capacity desiccant comprising modified carbon.

According to one embodiment, when the refrigerant consists essentially of water the preferred high-capacity desiccant can adsorb at least about 20 percent of its weight in water at 10 percent relative humidity at ambient temperature (e.g., 25° C.), and at least 40 percent of its weight in water at 50 percent relative humidity at ambient temperature. More preferably, the high-capacity desiccant will adsorb at least 40 percent of its weight at 10 percent humidity at ambient temperature and 60 percent of its weight at 50 percent relative humidity at ambient temperature. Even more preferably, the high-capacity desiccant will adsorb at least about 60 percent of its weight at 10 percent humidity at ambient temperature and at least about 80 percent of its weight at 50 percent humidity at ambient temperature.

Suitable desiccants include zeolites, barium oxide, magnesium perchlorate, calcium sulfate, calcium oxide, activated carbon, modified carbon, calcium chloride, glycerin, silica gel, alumina gel, calcium hydride, phosphoric anhydride, phosphoric acid, potassium hydroxide, sodium sulfate, and combinations thereof. A particularly preferred high-capacity desiccant is a surface modified porous support material. The porous support material can be a material such as activated carbon, carbon black or silica. Preferably, the porous support material has a pore volume of at least about 0.8 cm$^3$/g and average pore size of from about 1 nm to about 20 nm. The surface modification can include impregnating the porous support material with one or more metal salts, such as any one of calcium chloride, lithium chloride, lithium bromide, magnesium chloride, calcium nitrate, potassium fluoride and combinations thereof. The porous support material is preferably loaded with from about 20 to about 80 weight percent of the metal salt and more preferably from about 40 to about 60 weight percent of the metal salt.

Figure 13:
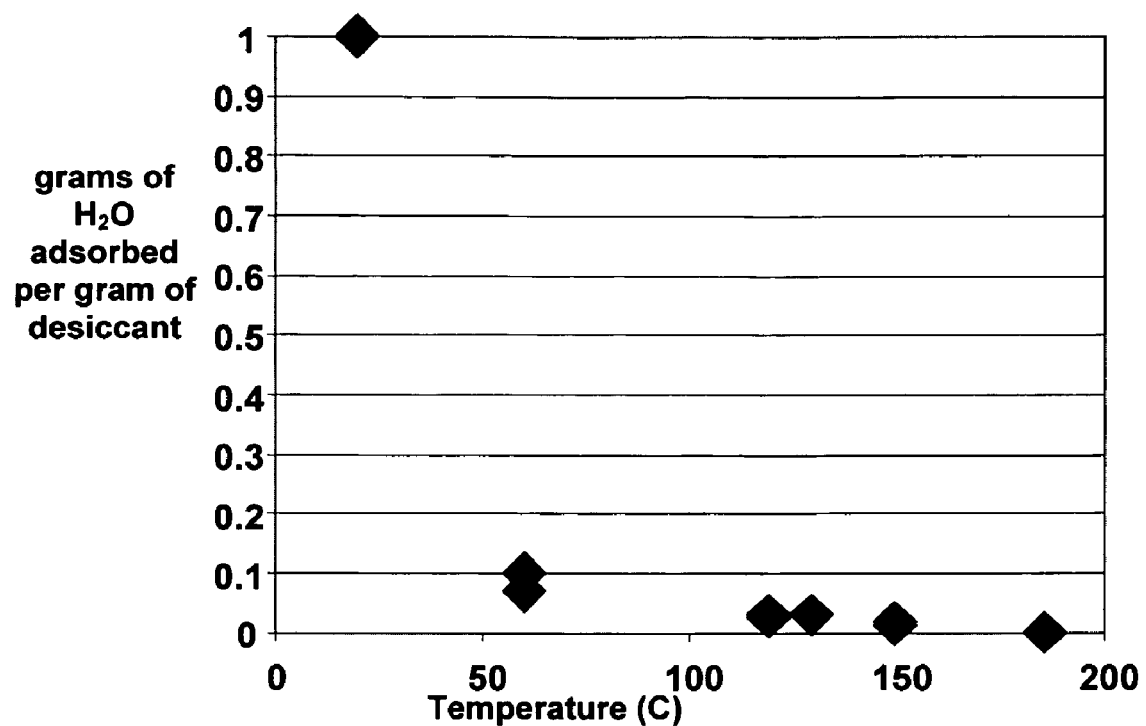
FIG. 13 is a graph depicting the adsorption capacity of a high-capacity desiccant as a function of temperature.

The high-capacity desiccant is also preferably of such a nature and quantity as to desorb most adsorbed liquid during the regeneration phase. In one embodiment, the high-capacity desiccant is capable of desorbing at least about 90% of adsorbed refrigerant at temperatures not greater than 120° C., preferably at least about 95% of adsorbed refrigerant at temperatures not greater than 120° C. and more preferably at least about 98% of adsorbed refrigerant at temperatures not greater than 120° C. FIG. 13 illustrates the adsorption capacity of the high-capacity desiccant as a function of temperature.

The high capacity desiccant is useful for reasons other than its ability to regenerate at temperatures of not greater than 120° C. For example, the adsorbent bed employed in the cooling system will generally be smaller than exhaust-type type cooling systems because of the high heat transfer coefficients of the liquid coolant as compared to the gas exhaust. The high adsorption capacity of the desiccant enables a reduction in the necessary bed-volume due to its adsorptive performance. Parasitic (unrecoverable) losses can also be reduced. Moreover, with respect to automotive applications, since the regeneration of the desiccant is accomplished using low-grade waste heat, the only power required to operate the sorption cooling system is one or more electric fans and one or more coolant pumps, which yields a high effective COP, as discussed in further detail below. Improved fuel economy and decreased emissions may also be witnessed.

One particularly preferred desiccant sheet includes a porous carbon sheet having a metal salt impregnated thereon. In a preferred embodiment, the desiccant sheets made of, inter alia, a carbon sheet that includes at least about 50% weight carbon impregnated with a metal salt selected from the group consisting of lithium chloride and calcium chloride. Preferably, the desiccant sheets include at least about 0.01 grams of carbon/cm$^2$ of adsorbent side surface area, more preferably at least 0.015 grams of carbon/cm$^2$ and more preferably at least 0.02 grams of carbon/cm$^2$. Preferably the desiccant sheets include at least 0.01 grams of metal salt/cm$^2$ of adsorbent side surface area, more preferably at least 0.02 grams of metal salt/cm$^2$, and more preferably at least 0.04 grams of metal salt/cm$^2$.

The desiccant sheets are preferably made by impregnating a carbon paper with the metal salt. Generally, the processing includes pre-treating the carbon paper with a surfactant, such as a mixture of 50% deionized water and 50% methanol, uniformly spraying the mixture onto the paper surface until the surface is just moistened, and contacting the moistened carbon sheet with a solution including the metal salt. When the pore volume of the carbon sheet has been filled, the salt/water/alcohol mixture will no longer wick into the surface. If a higher loading of salt is desired than was obtained with one wicking step, the paper sheet may be placed in an oven at 50° C. for several hours to dry the bulk of the liquid out of the pores and the pretreatment and wicking steps are repeated. Once the desired loading is achieved, the sheet may be placed in an oven at 70° C. under vacuum overnight to complete drying. After the sheet has been dried under vacuum, it is kept in a sealed container or handled in a nitrogen environment to prevent it from adsorbing atmospheric water. The above-described carbon sheets can be any sheets comprising a high surface area carbon material (e.g., activated carbon or carbon black), such as those produced by Mead-Westvaco, South Lee, Mass.

The desiccant sheets included in the adsorbent bed may be in any suitable form so long as the desiccant sheets are in fluid communication with the refrigerant flow path and thermal communication with the coolant flow path. The cross-sectional area of the desiccant sheets can be anything, but is generally slightly less than the corresponding cross-section area of the adsorbent bed casing. As noted above, the cross-sectional area of the desiccant sheets should be maximized to maximize the mass transfer and heat transfer capabilities of the adsorbent bed.

The desiccant sheets generally have a relatively low thickness to enable efficient heat transfer between the coolant and the desiccant sheets. Preferably, the desiccant sheets have a thickness of not greater than about 5 mm, preferably not greater than about 2 mm, and more preferably not greater than about 1 mm. To maintain structural integrity, the desiccant sheets should have a thickness of at least about 0.1 mm and more preferably at least about 0.5 mm.

The desiccant sheets should also be as light as possible to minimize the weight of the adsorbent bed. The desiccant sheet should also be structurally sound to withstand forces from the refrigerant and coolant fluid flows. The above-described carbon sheets are particularly preferred due to their low weight and sturdy nature.

As noted above, a fluid impermeable layer should cover one side of the desiccant sheets to prevent unwanted interaction between the desiccant sheets and the coolant. The fluid impermeable layer should also be relatively thermally conductive to enable efficient heating and/or cooling rates between the coolant and the desiccant sheets. The fluid impermeable layer should also be lightweight to help minimize the weight of the adsorbent bed. In this regard, preferred fluid impermeable layer materials include polyethylenes, polyurethanes, polyesters, COVEXX (available from Wipak, Finland) and metal foils. The fluid impermeable layer may be adhered to the desiccant sheet by any known method, such as lamination, ultrasonic welding, solvent welding and heat sealing.

Each of the desiccant sheets generally has at least one aperture. As noted above, the apertures define a portion of either the refrigerant or coolant paths. In one embodiment, the apertures define a portion of only the coolant flow path. In another embodiment, the apertures define a portion of only the refrigerant flow path. In yet another embodiment, a first set of apertures define a portion of the coolant flow path and a second set of apertures define a portion of the refrigerant flow path.

The desiccant sheets may have one aperture per sheet, but generally have a plurality of apertures per sheet. As the number of apertures increases, the number of fluid paths through the adsorbent bed correspondingly increases and the total frictional surface area available to the fluid decreases. This correspondingly decreases the friction factor through the adsorbent bed, which helps decrease the pressure drop through the adsorbent bed. Moreover, when the apertures are a portion of the refrigerant flow path, an increased number of refrigerant flow paths is witnessed, which can lead to greater utilization of the desiccant material.

According to one embodiment of the present invention, at least one of the desiccant sheets includes a plurality of apertures, such as at least 2, at least 4, at least 6, at least 8 and even at least 16 apertures per 40 in$^2$ (258 cm$^2$) of cross-sectional area of each sheet. However, it will be appreciated that the number of apertures also increases the complexity of the plumbing that must be accomplished to fluidly isolate flow paths through the adsorbent bed. Thus, according to one embodiment of the present invention the desiccant sheets preferably contain not greater than 256 apertures, such as not greater than 128 apertures, and in some instances not greater than 64 apertures per 40 in$^2$ (258 cm$^2$) of cross-sectional area of each sheet.

The desiccant sheets of the adsorbent bed can have the same number of apertures per sheet or the desiccant sheets can have different number of apertures per sheet, depending on the desired fluid flow paths and pressure drop within the system. In one embodiment of the present invention, a majority or even all of the desiccant sheets have the same number of apertures per sheet.

The orientation of the apertures through a desiccant sheet can be any orientation that enables efficient fluid flow through the device. In a preferred embodiment, the apertures are substantially orthogonal to the sheet. The apertures in the desiccant sheets can be created by any known means, including laser cutting and die cutting.

The apertures can be any shape that enables efficient fluid flow through the adsorbent bed. For example, the apertures can be substantially cylindrical, conical or a rectangular solid. In a preferred embodiment, the apertures are cylindrical to maximize the surface area available for adsorption while maximizing the amount of fluid flow paths through the adsorbent bed.

The apertures can be any width that enables efficient fluid flow through the bed while helping to maximize mass and heat transfer between the desiccant sheets with the refrigerant and coolant, respectively. The width/diameter of the apertures can be substantially the same or the size of the apertures can vary. In one embodiment of the present invention, all the apertures have substantially the same width. In another embodiment of the present invention, the width of the apertures is varied through the adsorbent bed to help facilitate minimal pressure drop while helping to maximize the number of fluid flow paths through the system. In a particularly preferred embodiment, the width of the apertures increases in a first direction across the plane of at least one of the desiccant sheets, and in a preferred embodiment across a majority or even all of the desiccant sheets.

Figure 14:
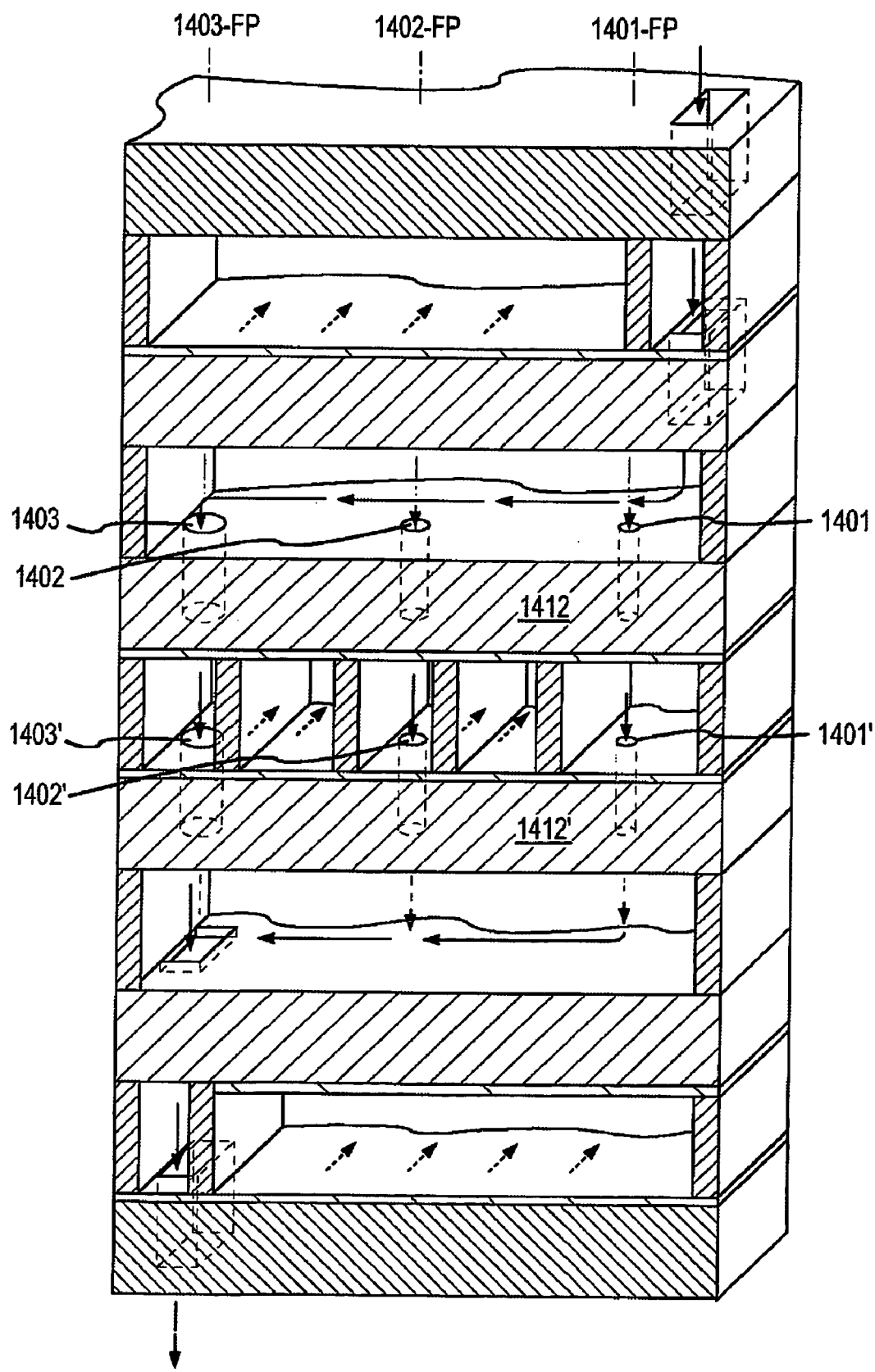
FIG. 14 is a cross-sectional, perspective view of one embodiment of an adsorbent bed of the present invention.

In a particularly preferred embodiment, as depicted in FIG. 14, a first desiccant sheet 1412 and a second desiccant sheet 1412' each include at least first, second and third apertures, 1401, 1401', 1402, 1402', 1403, and 1403'. The first apertures 1401, 1401' have a first diameter, the second apertures 1402, 1402' have a second diameter, and the third apertures 1403, 1403' have a third diameter, where the first diameter is less than the second diameter, and the second diameter is less than the third diameter. The first apertures 1401, 1401' are also aligned within a first flow plane 1401-FP of the adsorbent bed. Correspondingly, the second apertures 1402, 1402' and third apertures 1403, 1403' are also aligned in a second and third flow plane, 1402-FP and 1403-FP respectively. Preferably, these flow planes are substantially parallel to one another. This arrangement provides multiple fluid flow paths through the adsorbent bed while increasing fluid contact with the desiccant sheets with decreased pressure drop through the adsorbent bed.

The desiccant sheets can be arranged in any suitable manner within the adsorbent casing so long as efficient refrigerant and coolant flow paths are provided. In a preferred embodiment, the desiccant sheets are substantially parallel to one another. In one embodiment, the apertures of a majority of the desiccant sheets are aligned within one another, as depicted in FIG. 14. In one embodiment, the substantially parallel sheets are substantially orthogonal to a refrigerant inlet, a refrigerant outlet or both. Correspondingly, the substantially parallel sheets may also be substantially parallel to a coolant inlet, a coolant outlet or both. In an alternative embodiment, the substantially parallel sheets are orthogonal to a coolant inlet, a coolant outlet, or both. Correspondingly, the substantially parallel sheets may also be substantially parallel to a refrigerant inlet, a refrigerant outlet or both.

Figure 15A:
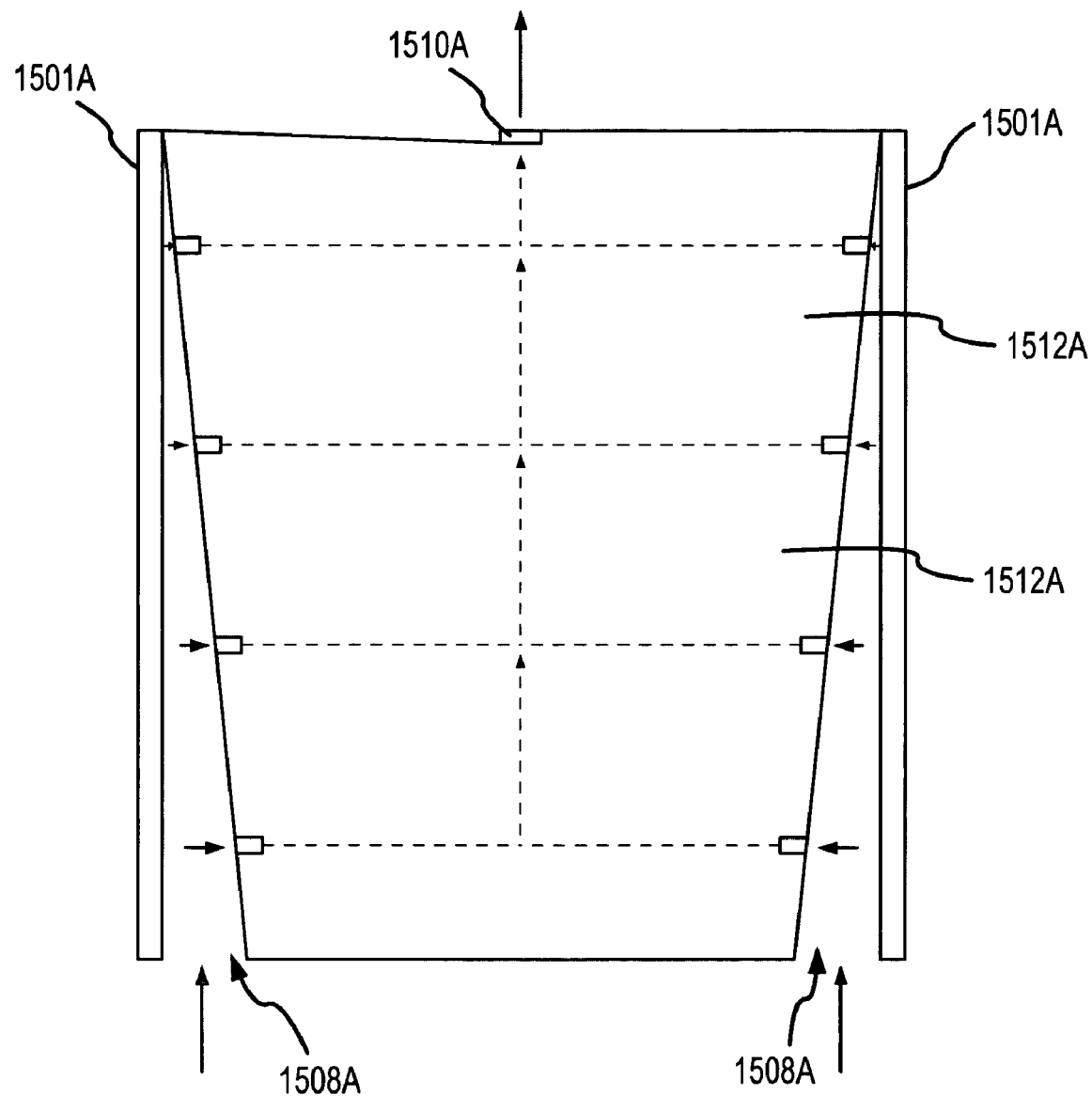
FIG. 15A is a side view of one embodiment of an adsorbent bed of the present invention.

The length and/or width of neighboring desiccant sheets may vary to help minimize flow imbalances within the system. In one embodiment, depicted in FIG. 15A, the width of the desiccant sheets 1512A decreases from the top of the bed to the bottom to help decrease flow imbalances of a fluid path (e.g., the coolant path) through the adsorbent bed. As coolant enters the casing 1501A via the coolant inlets 1508A, in this instance from the bottom, the amount of force required for the coolant to enter the top of the adsorbent bed will be more than the amount of force required for the coolant to enter the middle or lower portions of the adsorbent bed as the coolant will want to follow the path of least resistance. However, as the motive force for flowing the coolant (e.g., a fan or pump—not depicted) is above the coolant outlet 1510A of the adsorbent bed, the greatest motive force acting on the coolant will be at the top of the adsorbent bed. Therefore, this tapered bed structure helps to balance the forces acting on the fluid at the various levels of the bed.

Another embodiment of a structure designed to help decrease flow imbalances is provided in FIG. 15B. Coolant flows through coolant inlets 1508B and exits via coolant outlet 1510B. Again, the motive force (not depicted) for flowing the coolant is disposed above the coolant outlet 1510B, thereby providing the greatest motive force at the top of the adsorbent bed. However, in this embodiment the adsorbent bed casing 1501B is tapered in relation to the sides of the desiccant sheets 1512B, and the desiccant sheets 1512B are all relatively the same size. As with the previous embodiment, this tapered bed structure helps to balance the forces acting at the various levels of the bed. It will be appreciated that while the foregoing tapered bed embodiments have been described in relation to a coolant fluid, a refrigerant fluid could also be used in such embodiments. Additionally, both the desiccant sheet length/width and casing size could be varied to achieve the desired flow.

The space between the adsorbent sides of the desiccant sheets has been found to be an important factor in adsorbent bed performance, and relates to the mass transfer efficiency of and pressure drop of the refrigerant through the adsorbent bed. Preferably, the space between the first adsorbent sides of two desiccant sheets ("the first gap size") is such that the refrigerant contacts a large amount of desiccant with a small pressure drop. In one embodiment, the first gap size is not greater than 5 mm, preferably not greater than 2 mm, and more preferably not greater than 1 mm. However, preferably the first gap size is at least 0.05 mm, preferably at least 0.1 mm, more preferably at least 0.25 mm, and even more preferably at least 0.5 mm to decrease the amount of refrigerant pressure drop through the bed and help minimize complexity of manufacture. As noted above, the spaces between the desiccant sheets are provided by the spacing materials, described above.

With respect to the spaces between the second sides of the desiccant sheets (i.e., the fluid impermeable sides), these spaces relate to the volume of coolant and pressure required to flow coolant through the bed. Preferably, the space ("the second gap size") between the second side of a desiccant sheet and a second material (e.g., another second side of a desiccant sheet or the fluid casing) is such that the coolant contacts a large amount of fluid impermeable layer surface area with a small coolant volume and small coolant pressure drop. In this regard, it will be appreciated that the volume of coolant is directly related to the second gap size and the phase of the coolant used (i,e., gas or liquid phase). For gaseous coolants, a greater volume of fluid will be required to achieve the same amount of cooling as compared to a liquid coolant. Therefore, liquid coolants are generally preferred to cool and/or heat the adsorption bed of the present invention. It will be appreciated that the type of coolant, surface area to be heated/cooled, coolant inlet and outlet temperature, regeneration temperature, cool-off temperature and thermal conductivity of the fluid impermeable barrier and desiccant material are all considerations in evaluating the appropriate second gap size.

The adsorbent bed generally comprises a plurality of desiccant sheets. The number of desiccant sheets required is a function of several factors, including the desired cooling rate, which relates to the amount the evaporation rate of the evaporator, the type of refrigerant, the adsorption capacity of the desiccant and the amount and size of adsorbent beds utilized in the system. With this information the number of sheets can be calculated. For example, as noted above, a cooling capacity of 7.2 kW-Hr is desired by many vehicle manufacturers. Assuming a sorption cooling system with one evaporator and three beds operating in the three operating phases (i.e., regeneration, adsorption and cool-off), that 3.2 grams per second of water is evaporated in the evaporator at steady-state (equivalent to 90% efficiency of the evaporator in translating water evaporation into cooled cabin air), that the high-capacity desiccant is adapted to adsorb 1 gram of water per gram of desiccant, and a cycle time of 5 minutes, then each adsorbent bed must include 960 grams of high-capacity desiccant. Assuming that the desiccant sheets contain about 0.035 grams/cm$^2$ of desiccant material, about 27,450 cm$^2$ of desiccant sheet is required per bed (assuming thickness is negligible in relation to adsorption capacity). If the length and width of the desiccant sheets cannot exceed 250 cm$^2$, 110 sheets would be required.

As noted above, the refrigerant flow paths of the adsorbent bed provide fluid communication between the adsorbent beds and the evaporator and condenser, depending on the respective operating phase of the beds. As noted above, during regeneration operations the fluid communication includes the evaporation/desorption of the refrigerant from the desiccant into a carrier gas. During adsorption operations, the fluid communication includes the adsorption of the refrigerant onto the desiccant. Generally, the refrigerant flow paths should be defined to enable a high mass transfer rate within the bed at a low pressure drop. As noted above, a high number of refrigerant flow paths should be utilized for greater adsorbent utilization.

Preferably the pressure drop through the adsorbent bed is as small as possible to help minimize the size of the fans, pumps or other motive force required to circulate refrigerant and/or coolant therethrough. In one embodiment of the present invention, the pressure drop of refrigerant flow through the adsorbent bed is not greater than 4 inches of $H_2O$, preferably not greater than 2 inches of inches of $H_2O$, more preferably not greater than 1 inches of $H_2O$, and even more preferably not greater than 0.5 inches of $H_2O$.

The refrigerant flow paths are defined by the refrigerant inlet(s) and outlet(s) in the casing, and at least one of: (a) the apertures within the desiccant sheets, and (b) the spacing materials. In one embodiment, a plurality of refrigerant flow paths are defined by a plurality of refrigerant inlets, outlets and apertures. Referring back to FIG. 10A, a plurality of refrigerant inlets 1004 are provided for the refrigerant to enter the adsorbent bed casing 1001. Spacing materials 1022 and apertures 1014 define the path through which the refrigerant fluid may flow. The fluid exits the bed through refrigerant outlets 1006.

Figure 16:
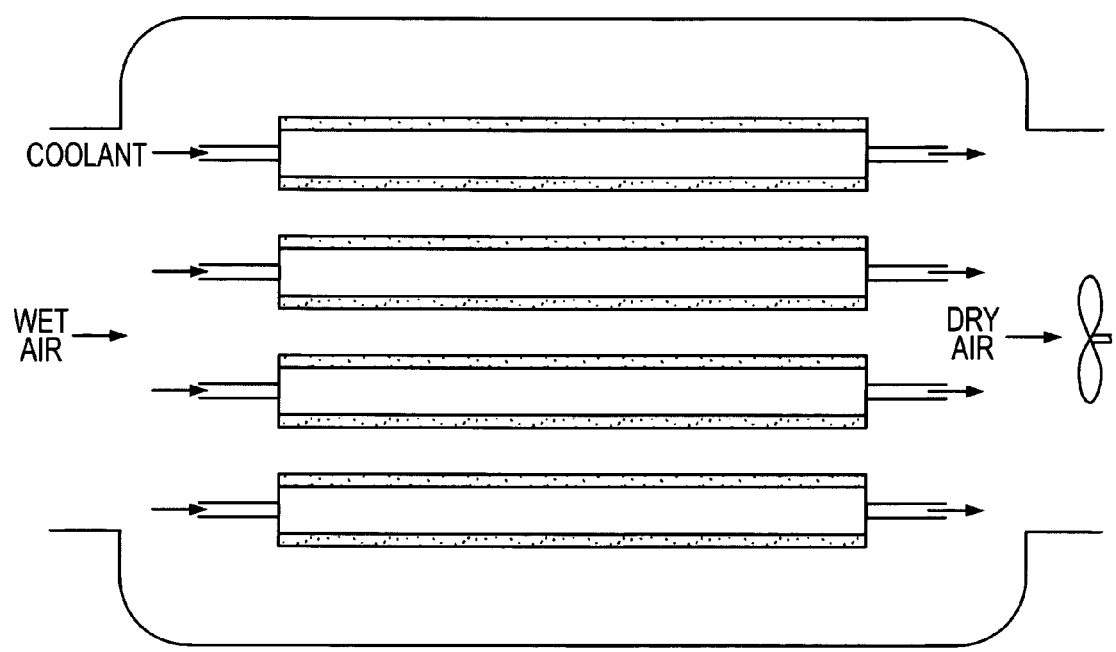
FIG. 16 is a cross-sectional view of one embodiment of an adsorbent bed of the present invention.

The refrigerant flow path may be substantially linear or non-linear through the adsorbent bed. A substantially linear flow path generally results in a low pressure drop, but may also witness an underutilization of adsorbent. It may also be more difficult to plumb coolant to the desiccant sheets. One embodiment of an adsorbent bed having substantially linear refrigerant flow paths is provided in FIG. 16. Wet air flows through refrigerant inlet and into the adsorbent bed casing. Various substantially linear flow paths provide fluid communication of the refrigerant to the desiccant sheets. Dry air exits the casing via refrigerant outlet. Coolant may be provided to the sheets to heat and/or cool such sheets.

As noted above, the refrigerant flow path may also be non-linear. A non-linear flow path generally has a higher pressure drop, but witnesses an increased adsorbent utilization. Ease of plumbing coolant may also be witnessed. One embodiment of an adsorbent bed having multiple non-linear (i.e., tortuous) flow paths is provided in FIG. 10A, described above. Wet air flows through the refrigerant inlets 1004 and into the adsorbent casing 1001. Apertures 1014 and spacing materials 1022 in the desiccant sheets 1012 help define non-linear flow paths for the refrigerant fluid to communicate with the first (adsorbent) side of the desiccant sheets. Dry air exits the casing via refrigerant outlets 1006. A fan (not shown) is generally used to circulate the air through the refrigerant flow paths.

The coolant flow paths are designed to provide high thermal exchange between the coolant and desiccant sheets with minimal volume, pressure drop and plumbing complexity. Like the refrigerant paths, the coolant paths are defined by the coolant inlet(s) and outlet(s), and at least one of: (a) the apertures within the desiccant sheets and (b) the spacing materials. Like the refrigerant flow paths, the coolant flow paths may also be linear or non-linear, and similar issues exist with respect to the coolant flow paths (e.g., pressure drop, heat transfer rate, plumbing complexity, etc.). The coolant flow paths are fluidly isolated from the refrigerant flow path to prevent interaction between the two streams. The fluid isolation is generally accomplished using the spacing materials and the fluid impermeable barrier on the second side of the desiccant sheet. The coolant flow paths are generally adjacent to the adsorption sections of the desiccant sheet to thermally communicate therewith. As noted above, the surface area of the coolant flow paths in contact with the desiccant sheets should be maximized for high heat transfer. As noted above, the coolant fluid is generally a liquid to enable high heat transfer, such as engine hot coolant from an internal combustion engine for regeneration operations, or cool coolant from a separate radiator for cooling operations.

The coolant flow paths can flow through the plurality of apertures or the spaces in the adsorbent bed created by the spacing materials, and the coolant generally flows through whichever path the refrigerant flow paths do not flow. Therefore, if the apertures are a portion of the refrigerant flow paths, the coolant flow paths would not be defined by the apertures and vice-versa.

Generally, the flow rate of coolant through the adsorbent beds is a function of the desired desiccant cooling/heating rate. Generally, temperature changes are exponentially related to difference in temperature between two objects. Therefore, flow rate in relation to temperature of the coolant and desired temperature and mass of desiccant to be cooled/heated must be evaluated to determine the appropriate coolant flow rate through the adsorbent beds. In one embodiment of the present invention, the mass of the desiccant sheets to cooling capacity ratio is <0.01 pounds per Watt-hour. Preferably, during regeneration operations 1 kW of air drying is achieved in five minutes with a desiccant sheet mass of less than 2 pounds.

Although certain embodiments of the adsorbent bed have been described with reference to certain orientations, shapes, sizes, numbers, etc., it will be appreciated that any number, size, shape and orientation of apertures, desiccant sheets, spacing materials and fluid inlets and outlets can be used in the adsorbent bed to create an infinite number of refrigerant flow and coolant flow paths having various orientations and capabilities.

The Evaporator of the Sorption Cooling System

The evaporator of the sorption cooling system of the present invention may be any evaporative cooling type of evaporator adapted to cool a fluid stream in contact with at least a portion thereof. In one preferred embodiment, the evaporator includes at least one thermally conductive sidewall for transferring thermal energy to the fluid stream proximal thereto, such as a wet-walled evaporator comprising a thermally conductive plastic wall.

Figure 17:
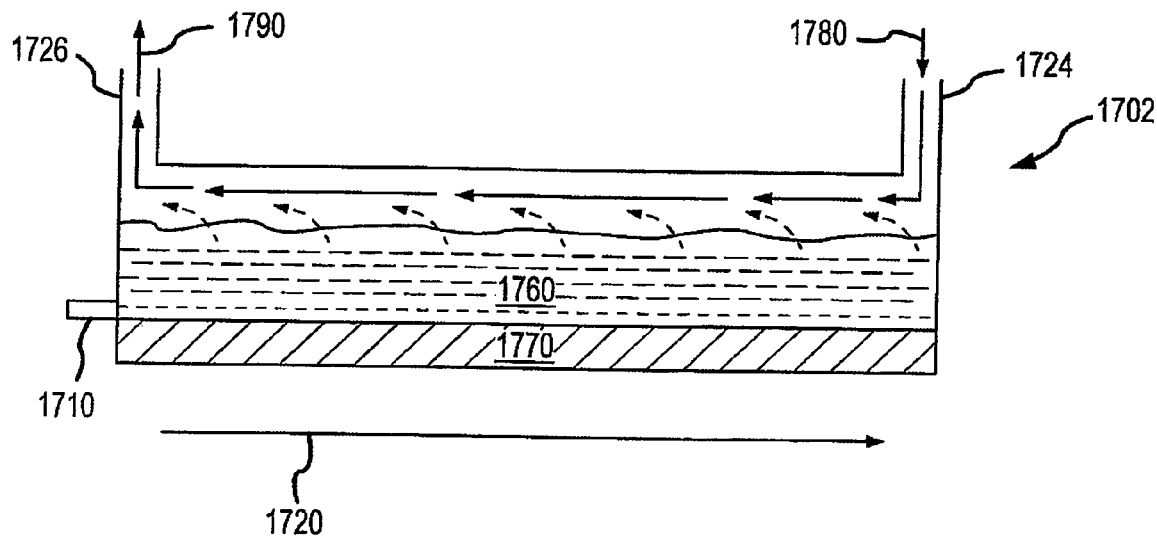
FIG. 17 is a cross-sectional view of a typical sorption cooling system evaporator.

One embodiment of an evaporator useful in accordance with the present invention is depicted in FIG. 17. The evaporator 1702 includes a thermally conductive sidewall 1770, refrigerant 1760 in contact therewith, a liquid supply line 1710 for receiving refrigerant 1760 from a refrigerant source (not shown), such as a condenser, and air inlets 1724 and outlets 1726. Dry air 1780 enters air inlet 1724, and as it passes through the evaporator, refrigerant (e.g., water) will evaporate into the dry air, thereby cooling the refrigerant 1760 and corresponding thermally conductive sidewall 1770. Cabin air 1720 flows proximal to the thermally conductive sidewall 1770, where it is cooled. Wet air 1790 exits evaporator via air outlet 1726. Dry air and liquid refrigerant may be continuously supplied using the above-described sorption cooling system to enable continuous cooling by the evaporator.

The thermally conductive sidewall can be any material that is lightweight, fluid impermeable and has a high thermal conductivity, such as metals, metallized films and thermally conductive plastics. Particularly preferred sidewall materials include thin metallized plastics, such as those produced by Rexam (Evansville, Ind., United States of America), Toyo Aluminum (Japan) and Wipak (Finland).

Figure 18:
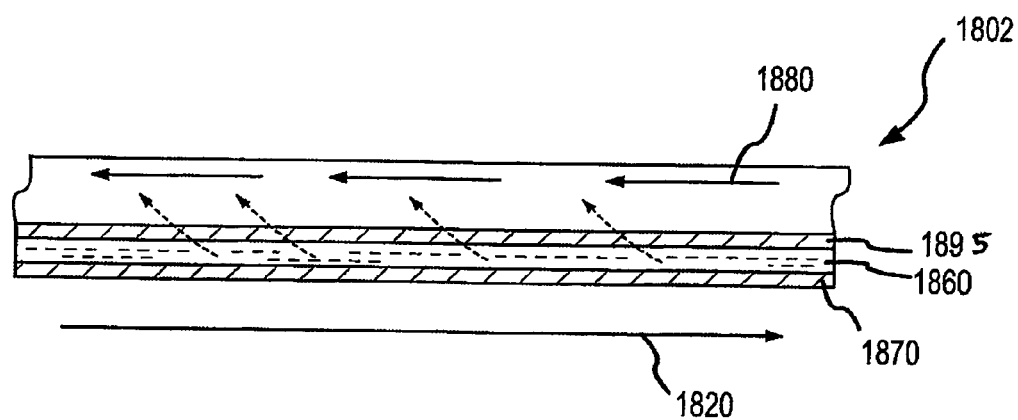
FIG. 18 is a cross-sectional view of one embodiment of an evaporator for use in a sorption cooling system of the present invention.

A particularly preferred evaporator useful in accordance with the present invention is referred to herein as a thin-filmed evaporator comprising a membrane material disposed between the liquid refrigerant and the air flow path through the evaporator. One embodiment of such an evaporator is depicted in FIG. 18. The evaporator 1802 includes thermally conductive sidewall 1870, refrigerant 1860 in contact therewith, a liquid supply line (not shown), a membrane material 1895 and air flow inlets and outlets (not shown). Air 1880 flows proximal to the membrane material, creating a pressure and concentration gradient across the membrane, thereby causing refrigerant 1860 to evaporate into the air stream. As described above, this cools the refrigerant 1860 and corresponding thermally conductive sidewall 1870. Cabin air 1820 flows proximal to the thermally conductive sidewall 1870, where it is cooled.

The membrane material is used to tailor the evaporation rates to achieve the desired amount of cooling within the evaporator. Generally, the membrane material has a high vapor permeance and no or little liquid permeance. In one embodiment, the membrane material is a vapor permeable material/fluid impermeable material. There are two general classes of vapor permeable membranes. The first are porous and hydrophobic, such as made from expanded PTFE, so that liquid will not penetrate through the pores below some pressure, which depends upon pore size and contact angle. The second class comprises dense membranes typically produced from substituted polyurethanes. These have the advantage of higher operating pressure but lower vapor fluxes.

Particularly preferred membrane materials in accordance with the present invention include such dense substituted polyurethanes, such as those produced by Porvair PLC (Norflolk, United Kingdom), including PORVAIR P3 SB75. Expanded PTFE membranes may also be used, such as TETRATEX produced by the Donaldson Company (Minneapolis, Minn., United States of America).

Preferably, the membrane material is tailored to achieve efficient mass transport between the refrigerant and air. With typically required evaporation rates in automotive applications, the membrane material generally has a thickness sufficient to withstand from about 1.5 psi (10.3 kPa) to about 15 psi (103.4 kPa) of liquid pressure without liquid crossover, such as from 3.0 psi (20.7 kPa) to about 5.0 psi (34.5 kPa) of liquid pressure.

A typical amount of cooling capacity required by vehicle manufacturers is 7.2 kW-Hr. One variable utilized to achieve this cooling capacity is the size and amount of evaporators utilized within the sorption cooling system. In one embodiment of the present invention, a single evaporator is used to provide cooling to incoming air. However, the size of such an evaporator may be too large for practical purposes. Thus, in a preferred embodiment, a multiple-stage sorption cooling system is employed to achieve the desired cooling, where the multiple-stage sorption cooling system utilizes a series of evaporative coolers to cool the incoming cabin air. Using a multiple-stage sorption cooling system may enable a reduction in overall evaporator size due to efficiencies realized between the multiple adsorbent beds, evaporators, and cabin air in contact therewith.

Figure 19:
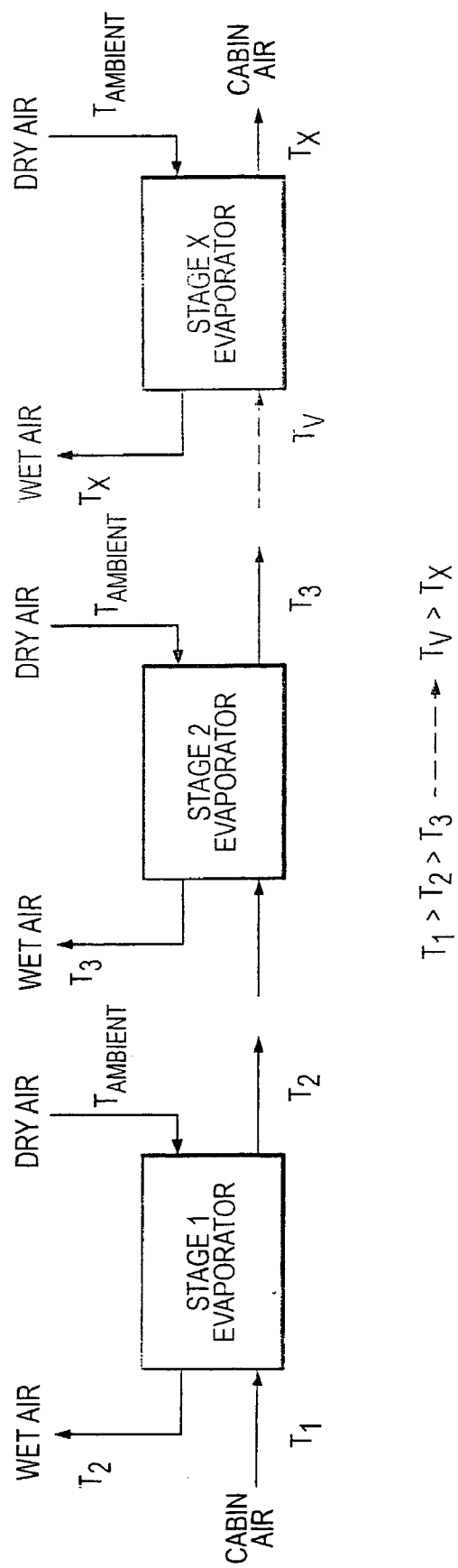
FIG. 19 is a flow-diagram illustrating one embodiment of a multiple-stage sorption cooling system useful in accordance with the present invention.

Referring now to FIG. 19, a multiple-stage sorption cooling system is provided where a plurality of evaporators from such sorption cooling systems operate in series to cool cabin air to a predetermined threshold level. Cabin air enters the first stage evaporator at $T_1$ and leaves at temperature $T_2$, where $T_1 > T_2$. In this regard, dry air from an adsorbent bed enters at ambient temperature and wet air leaves the first stage evaporator at $T_2$. Cabin air enters the second stage evaporator at $T_2$ and leaves at temperature $T_3$, where $T_2 > T_3$. Dry air from an adsorbent bed enters the second stage evaporator at ambient temperature and wet air exits leaves at $T_3$. As will be appreciated, cabin air can be supplied to subsequent evaporators until the desired level of cooling is achieved and/or the number of evaporators has reached a threshold level where no further cooling will occur. Cabin air enters the final evaporator stage at $T_y$ and exits at $T_x$, where $T_y > T_x$. The number of evaporative stages can be determined by calculating the total cooling required cooling capacity in relation to the cooling capacity of a single stage. As noted above, the cooling capacity of each stage is a function of the refrigerant utilized, the evaporation rate of the refrigerant, and the desired size of the evaporator.

By way of illustration, if it is desired to cool 200 liters per second (LPS) of air from 40° C. to 4° C., about 7.2 kW of cooling would be required, assuming water is the refrigerant and that heat capacity and density remain relatively constant over this temperature range. If 8.9 grams of water per second are evaporated (equivalent to 32% evaporator cooling efficiency), 400 Watts of cooling is produce per evaporator, requiring 18 evaporators to achieve the desired cooling capacity. However, the total cooling capacity of the entire cooling system is limited by the achievable cooling temperature of the evaporator. Dry air exiting an adsorbent bed and entering the evaporator may have a temperature of about 45° C. and about 0% relative humidity. Since the inlet air from the adsorbent bed is always the same for each stage, the cooling temperature is limited by the dew point of that air, which is approximately 11.7° C. for this example. This cooling temperature also limits the exit cabin air to a temperature of about 12° C. Assuming that each evaporator stage cools the air by about 2° C., a total of only 14 stages is required in this embodiment, ((40° C.–12°C.)/2° C.).

Figure 20:
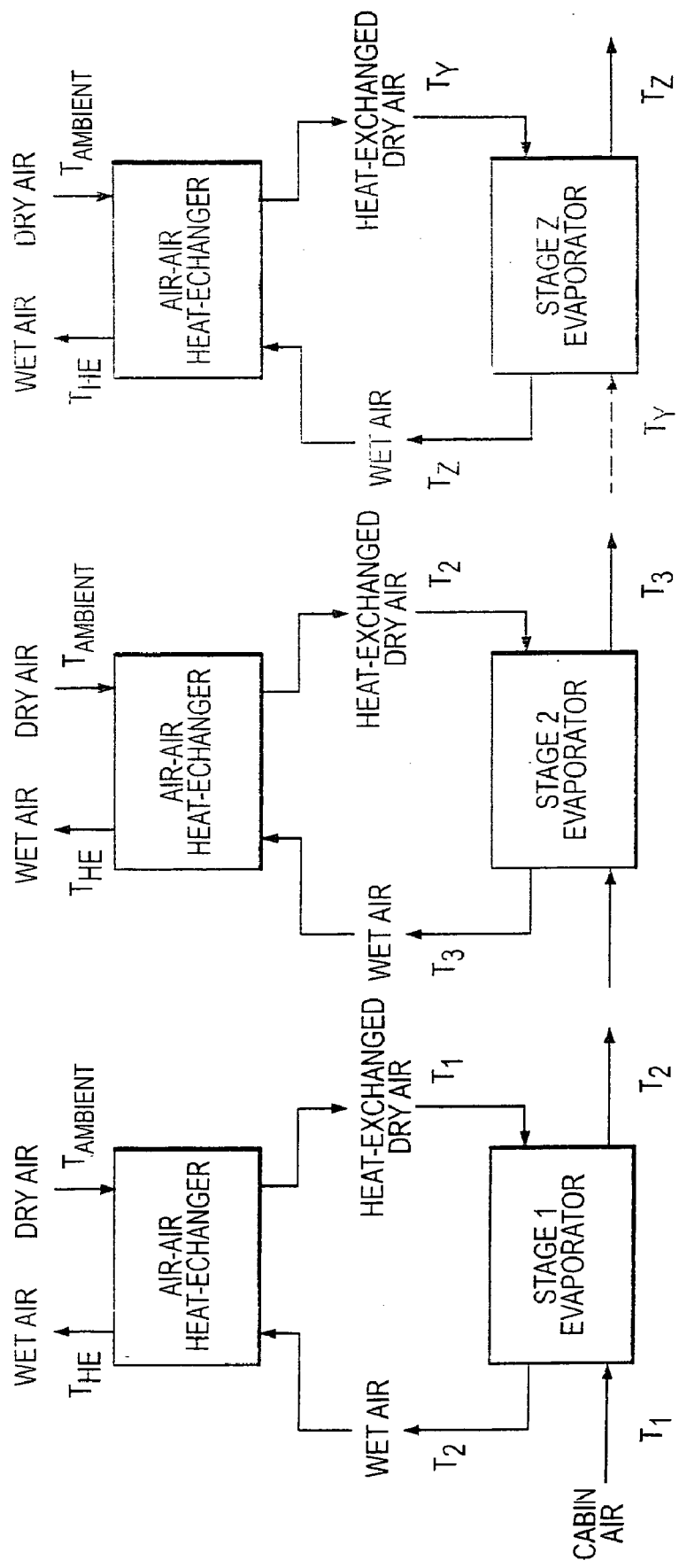
FIG. 20 is a flow diagram illustrating one embodiment of a multiple-stage sorption cooling system useful in accordance with the present invention.

Another multiple-stage sorption cooling system useful in accordance with the present invention is an energy-recovery multiple-stage system, such as that depicted in FIG. 20. In this embodiment, instead of the wet, cool air leaving each stage and returning to the adsorbent bed for adsorption without interacting with other streams, the wet, cool air from each stage is utilized to cool the incoming dry air to decrease its temperature and corresponding dew point. As depicted in FIG. 20, cabin air enters the first stage evaporator at $T_1$ and exits at $T_2$ (at steady-state). Dry air from an adsorbent bed at $T_{Ambient}$ enters an air-air heat exchanger where it exchanges its heat with the wet air (at temperature $T_2$) exiting the first evaporator stage. The heat-exchanged dry air exits the air-air heat exchanger at $T_1$ where it is used in evaporation operations. As $T_1$ is less than $T_{Ambient}$, the dew point of the heat-exchanged dry air will be less than in the previously described multiple-stage sorption cooling system, and the cooling potential will correspondingly increase with each stage. For example, cabin air enters the second evaporator stage at $T_2$ and exits at $T_3$. As with the first stage, dry air enters the air-air heat exchanger at $T_{Ambient}$, exchanges thermal energy with the entering wet air (at $T_3$) and enters the second stage evaporator at $T_2$. As $T_1 > T_2$, the dew point of the heat-exchanged dry air will be less than that of the first stage, and the cooling potential shall correspondingly increase. As will be appreciated, cabin air can be supplied to subsequent evaporators until the desired level of cooling is achieved and/or the number of evaporators has reached a threshold level where no further cooling will occur. Cabin air enters the final evaporator stage at $T_y$ and exits at $T_z$, where $T_y > T_z$.

The performance of this energy recovery multiple-stage sorption cooling system is generally superior to that of the non-energy recovery multiple-stage system. Table 1 depicts the general performance of a non-energy recovery system versus an energy recovery system using incoming air at 200 LPS and a temperature of 40° C.

TABLE 1

|  | Non-Energy Recovery System | Energy Recovery System |
| --- | --- | --- |
| Cabin air exit temperature | 12° C. | 4° C. |
| Dry/wet air flow rate through adsorbent beds | 541 LPS | 159 LPS |
| Amount of water required to be evaporated | 8.9 g/sec | 3.0 g/sec |
| Temperature of air returned to the adsorbent bed | 14° C. | 43° C. |
| Relative humidity of the air returned to the adsorbent bed | 100% | 22% |
| Water usage efficiency | 32% | 96% |

One other potential benefit of the energy recovery multiple-stage system is that the size of the evaporators may decrease at each corresponding stage as less water will be required to be evaporated to achieve the desired cooling due to the lower temperature of the incoming air.

A preferred multiple-stage evaporator in accordance with the present invention is a multi-channel, meso-channel width heat exchanger implementing the above energy recovery multi-stage evaporation system. Such a multiple-state sorption cooling system is also disclosed in commonly-owned U.S. Patent Provisional Application No. 60/688,593, entitled "MULTIPLE STAGE SORPTION COOLING APPARATUS, SYSTEM AND METHOD" and filed Jun. 8, 2005, which is incorporated herein by reference in its entirety.

Performance of the Sorption Cooling System

The effective COP of the vehicle sorption cooling system of the present invention is relatively high. Generally, the only power required is that necessary to operate the coolant circulating pump, any necessary fans and any necessary valves. Thus according to one embodiment of the present invention, the sorption cooling system has an effective COP of performance of at least about 8, preferably of at least about 10, more preferably of at least about 12 and even more preferably, of at least about 14. In this case, COP is defined as the realized cooling energy divided by the electrical power (i.e., the "wall-plug" efficiency).

The pressure within the evaporation, adsorber and refrigerant source of sorption cooling system is also much less than generally required for a traditional compression-based air conditioner. Typically, the pressure within such components is preferably not greater than 14.7 psig (101.3 kPa), preferably not greater than 10 psig (68.9 kPa), more preferably not greater than 5 psig (34.5 kPa), and even more preferably not greater than 2.5 psig (17.2 kPa).

EXAMPLES

Example 1

Water Adsorption Isotherms for Desiccant Materials

Figure 21:
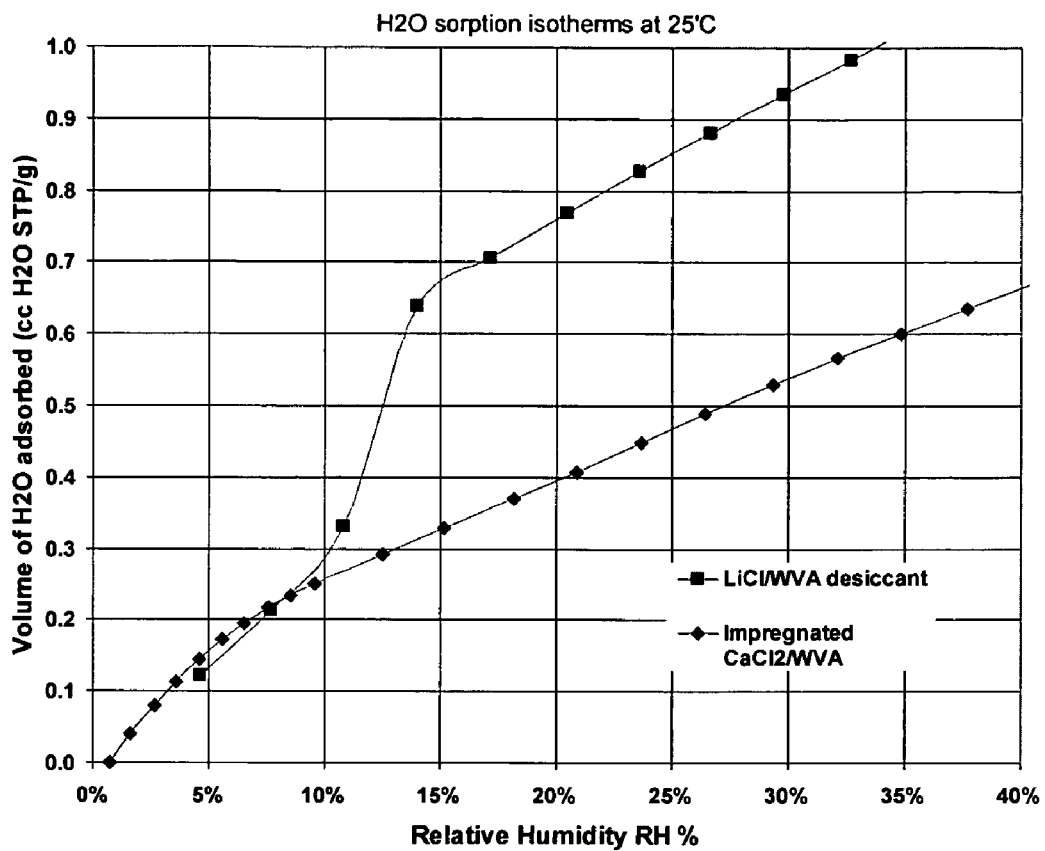
FIG. 21 is a graph depicting water adsorption isotherms for $CaCl_2$ and $LiCl$ based desiccants.

Water adsorption isotherms were measured at 25° C. for $CaCl_2$-based and LiCl-based desiccant materials. The results are depicted in FIG. 21. Although both desiccant materials perform similarly at less than about 10% relative humidity (RH), at higher humidity the LiCl-based material was more adsorbent.

Example 2

Performance of a First Adsorbent Bed Having 64 Adsorption Sections

Figure 22:
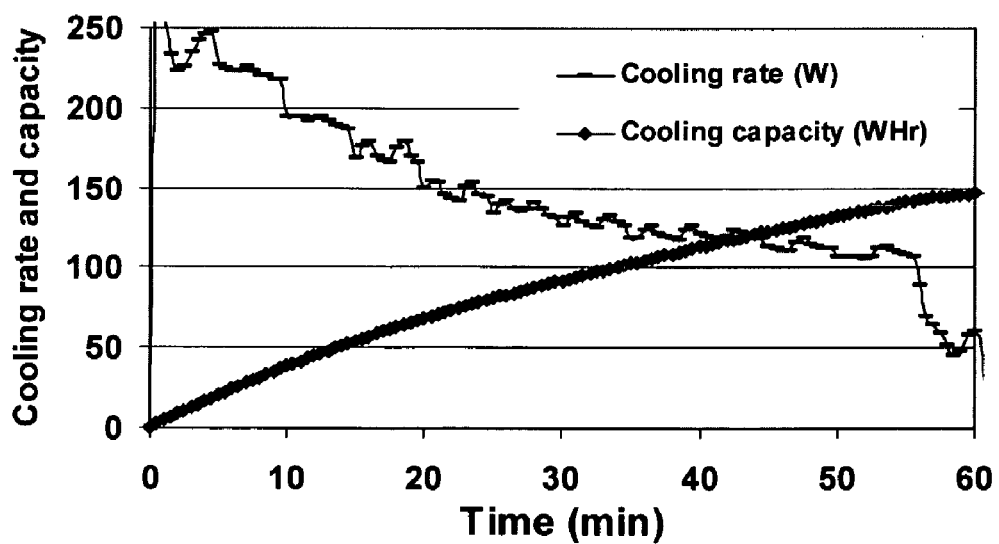
FIG. 22 is a graph depicting cooling rate and capacity as a function of time for one embodiment of a sorption cooling device of the present invention.

An adsorbent bed having 64 adsorption sections was fabricated (an adsorption section is defined by the number of apertures and spacing materials per sheet and their physical relation to one another). An air stream at 35° C. and 95% RH was flowed through the adsorbent bed, and the outlet temperature and humidity were measured over time. The measured cooling rate and cooling capacity are illustrated in FIG. 22.

Example 3

Performance of a Second Illustrated Adsorbent Bed Having 64 Adsorption Sections

Figure 23:
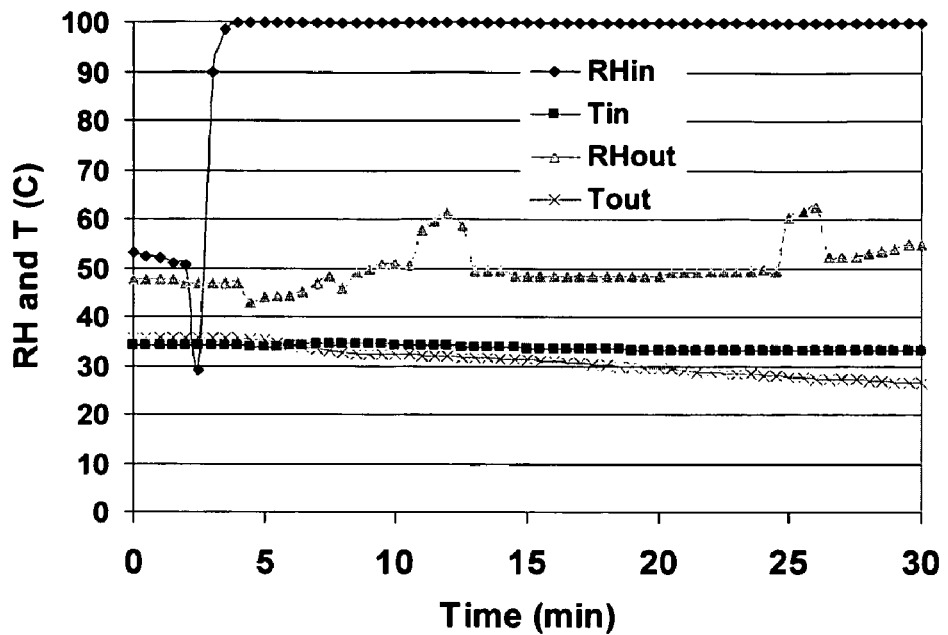
FIG. 23 is a graph depicting relative humidity and temperature measurements versus time for one embodiment of a sorption cooling device of the present invention.
Figure 24:
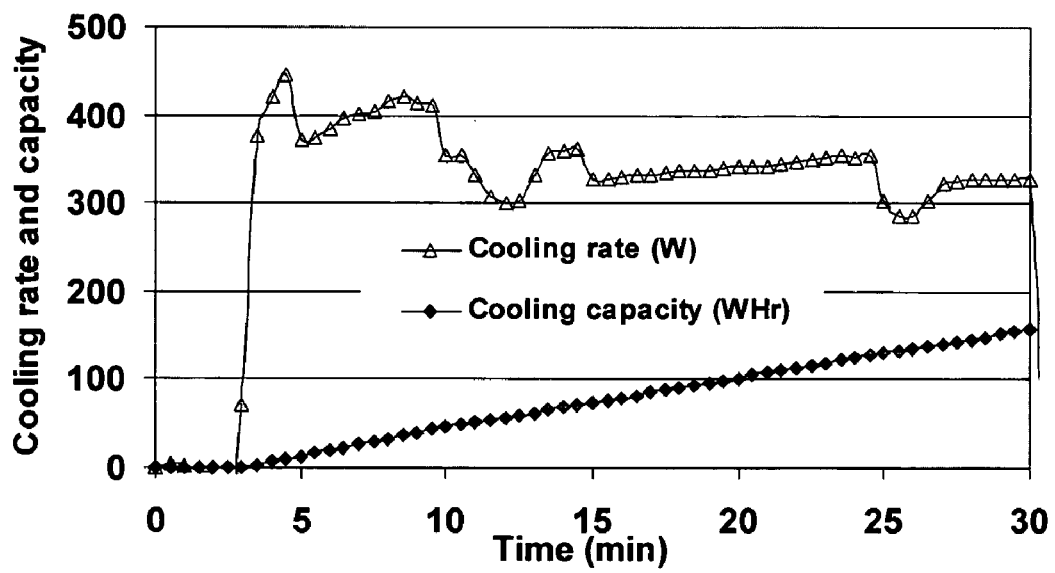
FIG. 24 is a graph depicting cooling rate and capacity as a function of time for one embodiment of a sorption cooling device of the present invention.

An adsorbent bed having 64 adsorption sections was fabricated (an adsorption section is defined by the number of apertures and spacing materials per sheet and their physical relation to one another). An air stream at 35° C. and 95% RH was flowed through the adsorbent bed, which included a $CaCl_2$ desiccant material, and the outlet temperature and humidity were measured over time. A total of six runs were conducted. Table 2 summarizes the results. Measured inlet and outlet temperatures and measured inlet and outlet relative humidity for one test are depicted in FIG. 23. The measured cooling rate and cooling capacity for this test are depicted in FIG. 24. The sorption cooling system averaged about 320 watts of cooling over 30 minutes, with a cooling capacity of 157 W-Hr.

TABLE 2

Performance of A Second Adsorbent Bed Having 64 Adsorption Sections

| Test | Surface Modification Material | Air flow (LPS) | Time (min) | Water Gained (g) | Inlet RH | Outlet RH | Average Cooling (W) | Cooling Capacity (W-Hr) |
|---|---|---|---|---|---|---|---|---|
| 1 | $CaCl_2$ | 10.2 | 60 | 267 | 90* | 75 | 340 | 340 |
| 2 | LiCl | 10.2 | 60 | 214 | 80* | 50 | 183 | 183 |
| 3 | Non-modified | 8.0 | 30 | 101 | 80* | 60 | 160 | 81** |
| 4 | $CaCl_2$ | 9.0 | 30 | 98 | 100 | 50 | 320 | 157** |
| 5 | LiCl | 11.1 | 30 | 157 | 100 | 60 | 420 | 208** |
| 6 | $CaCl_2$ | 3.8 | 30 | 80 | 100 | 70 | 138 | 69** |

*Inlet humidity was lower than target because the adsorbent bed was removing water vapor faster than the humidifier could produce it.
**Only tested for 30 minutes.

Example 4

Measured Effect of Spacing Between Desiccant Sheets

Figure 25:
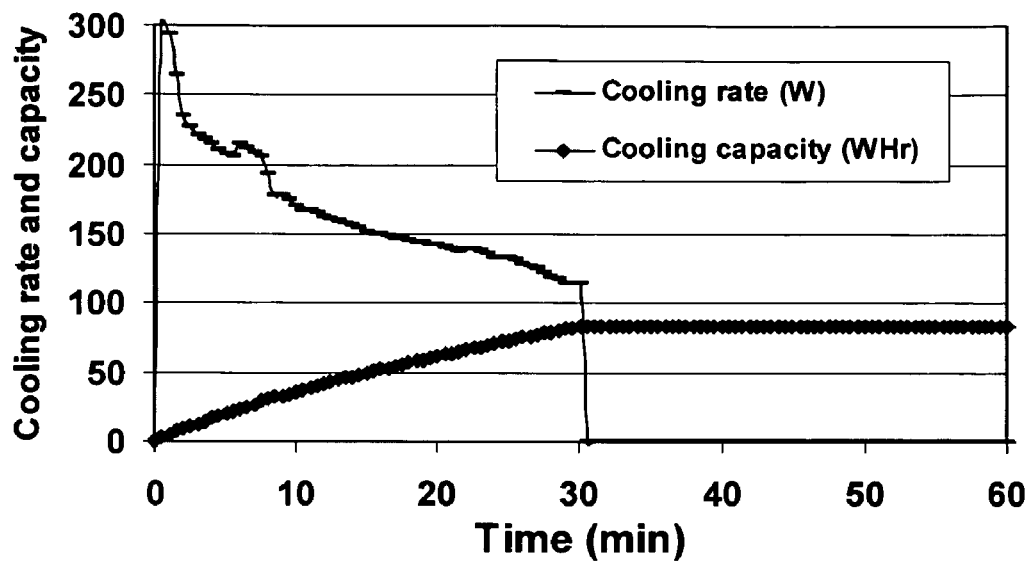
FIG. 25 is a graph depicting cooling rate and capacity as a function of time for one embodiment of a sorption cooling device of the present invention.
Figure 26:
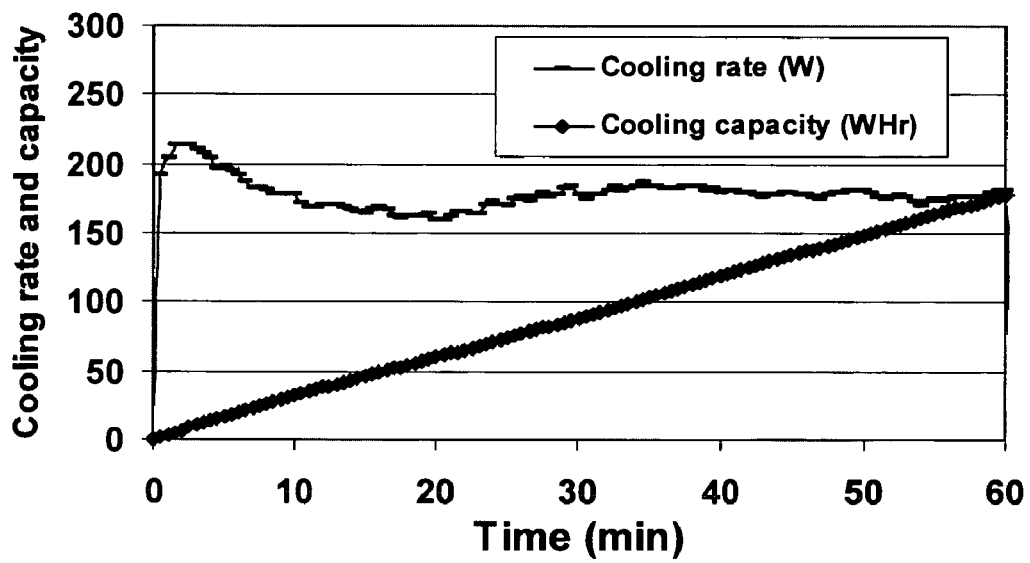
FIG. 26 is a graph depicting cooling rate and capacity as a function of time for one embodiment of a sorption cooling device of the present invention.

In the above Example 3, the adsorption beds used a 0.5 mm space between the adsorbent sides of the desiccant sheets and a 1 mm space between the cooling sides of the adsorbent sheets. An adsorbent bed having a 1.0 mm gap space between the adsorbent sides and a 1.25 mm space between the coolant (i.e. fluid impermeable) sides of the adsorbent sheets was fabricated. Humid air at 4 LPS was flowed through the refrigerant paths and air at 23 LPS was flowed through the coolant paths. The measured pressure drop through the refrigerant paths was 0.35 in. $H_2O$ (0.65 mm Hg) as compared to a 1 in. $H_2O$ (1.87 mm Hg) for the previous bed. Cooling rates and capacity using this 1.0 mm adsorbent side gap spacing at 4 LPS of refrigerant are illustrated in FIG. 25 (test was stopped after 30 minutes). Cooling rates and capacity using this 1.0 mm adsorbent side gap spacing at 8 LPS of refrigerant are illustrated in FIG. 26, and evidenced about a 180 W-Hr cooling capacity.

Figure 27:
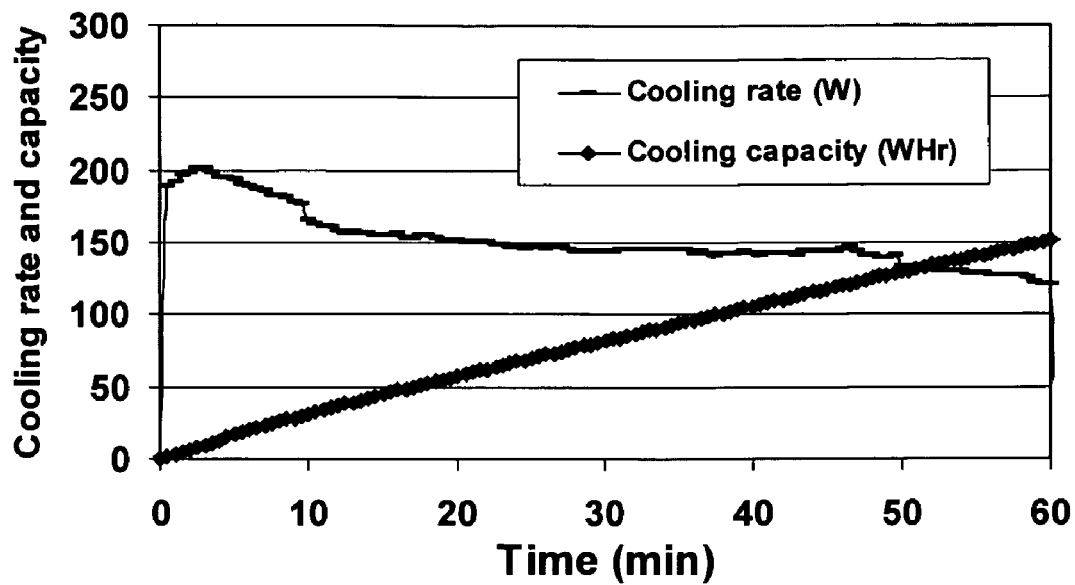
FIG. 27 is a graph depicting cooling rate and capacity as a function of time for one embodiment of a sorption cooling device of the present invention.

Another adsorbent bed was produced using a 1.5 mm adsorbent gap size instead of the above 1.25 mm. The pressure drop through this adsorbent bed was 0.30 in. $H_2O$ (0.56 mm Hg). The performance of this adsorbent bed was nearly as good as the adsorbent bed having a 1.25 mm adsorbent side gap spacing, as depicted in FIG. 27.

Figure 28:
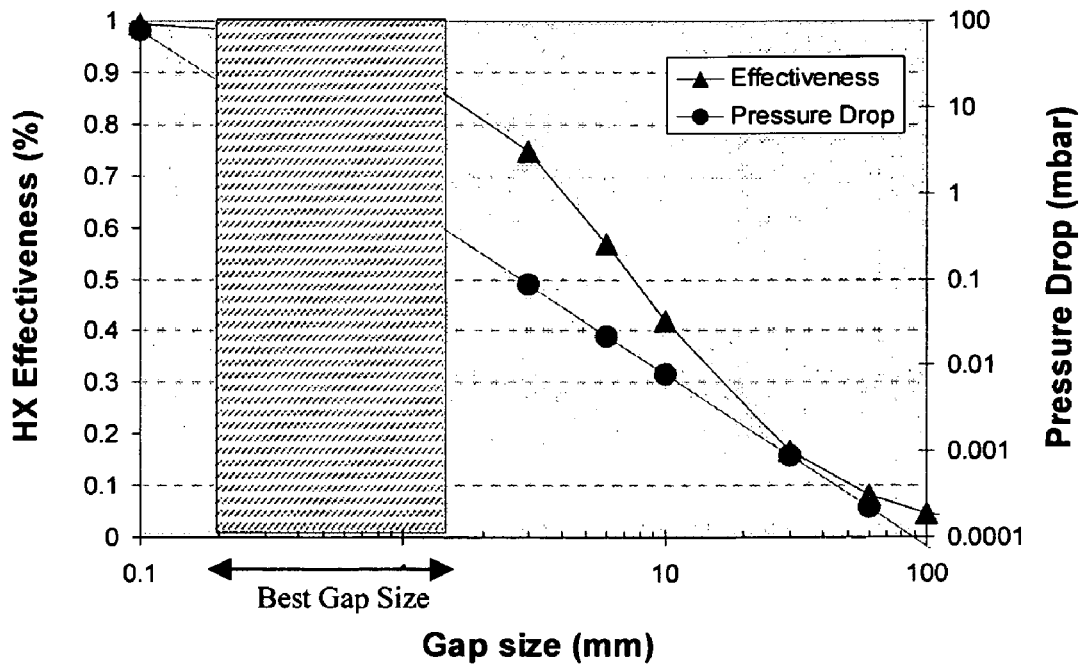
FIG. 28 is a graph depicting heat transfer effectiveness and pressure drop as a function of gap size for one embodiment of an adsorbent bed of the present invention.

As noted above, the gap spacing between the coolant sides of the sheets is also important. FIG. 28 illustrates the calculated heat transfer efficiency between the desiccant sheets and an air coolant fluid and the corresponding pressure drop within an adsorbent bed as a function of coolant side gap spacing.

Example 5

Adsorbent Bed Using Desiccant Sheet as Spacer Material

Figure 29:
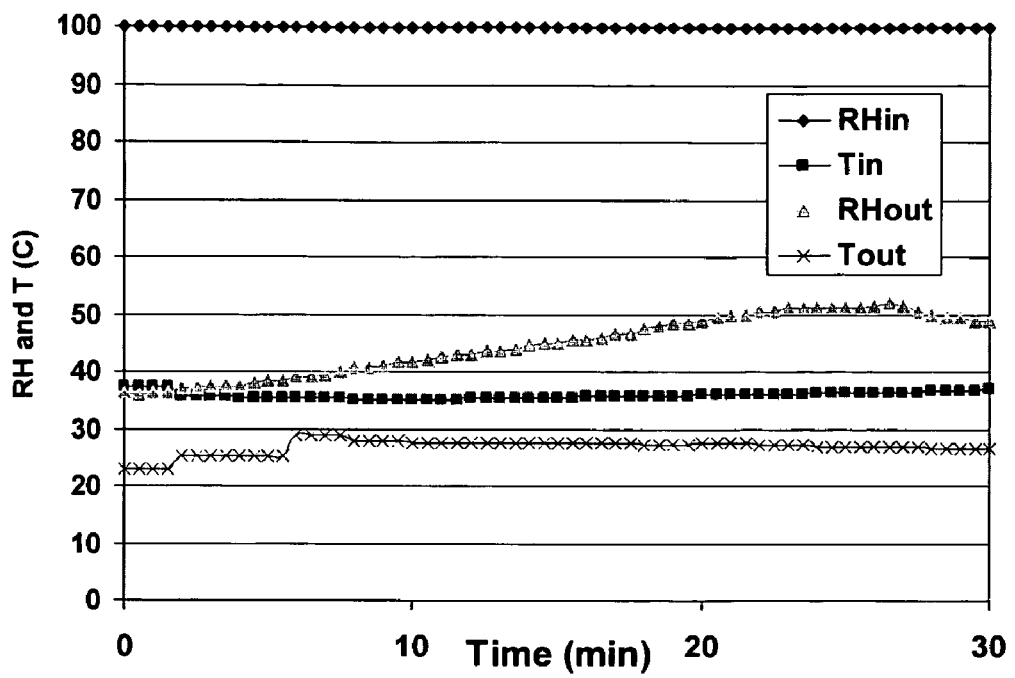
FIG. 29 is a graph depicting relative humidity and temperature measurements versus time for one embodiment of a sorption cooling device of the present invention
Figure 30:
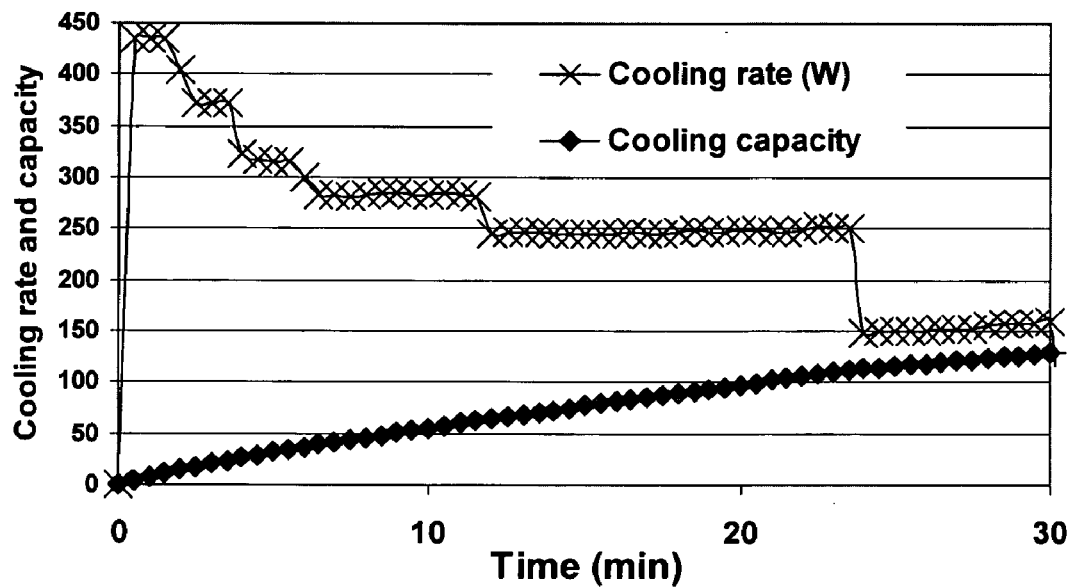
FIG. 30 is a graph depicting cooling rate and capacity as a function of time for one embodiment of a sorption cooling device of the present invention.

An adsorbent bed was fabricated using $CaCl_2$ impregnated sheets and laser cut desiccant sheets having a thickness of 0.5 mm as the spacing material instead of using a 0.5 mm thick polycarbonate spacing material. The desiccant sheets weigh less than the polycarbonate spacing materials, have a higher adsorption capacity and more readily adhere to the adjoining desiccant sheets. For this example, the total weight reduction was 35 grams. An air stream at 35° C. and 100% RH was fed to the adsorbent bed, and the output temperature and humidity measured were measured over time, the results of which are illustrated in FIG. 29. The measured cooling rate and capacity are illustrated in FIG.

30. The sorption cooling system averaged 260 watts of cooling, peaking at 440 watts, and a cooling capacity of 130 watt-hours.

Example 6

Testing of Membrane Permeability for Thin-filmed Evaporator

Figure 31:
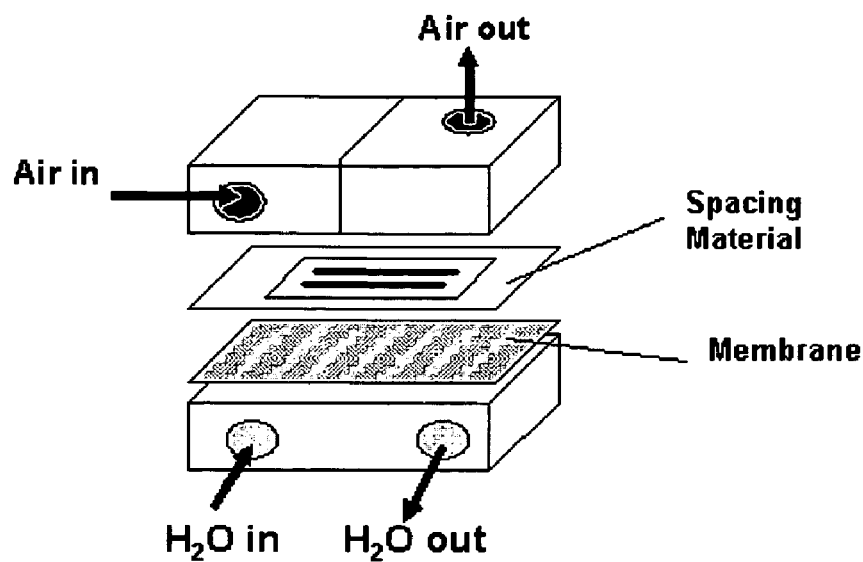
FIG. 31 is a perspective view of a single membrane material test cell apparatus.

A single membrane test cell was constructed that allowed the testing of a 1"×2" membrane material having flowing water on one side and flowing air on the other side. The test cell is depicted in FIG. 31. The inlet and outlet temperature of both air and water streams were measured, as well as the inlet and outlet humidity of the air streams. The water inlet temperature was 20° C. and the flow rate was maintained such that the water temperature was essentially constant. Compressed air at ~28° C. and 20% RH was fed into the test cell and the flow rate was controlled over the range of 1 to 30 liters per minute. Results are summarized in Table 3.

TABLE 3

Flux measurements from single membrane tester.

| Membrane | $g/m^2$ day at lpm | $g/m^2$ day at lpm | $g/m^2$ day at lpm |
|---|---|---|---|
| Expanded PTFE (1 μm thick) | 9,400 at 1 lpm | 20,670 at 9.2 lpm | 19,620 at 30 lpm |
| Porvair P3-SB-75 | 25,840 at 10 lpm | 34,070 at 20 lpm | 34,810 at 30 lpm |

Example 7

Evaporator Testing

An evaporator module was constructed having an available evaporative surface area of 0.05 $m^2$. A polyurethane-coated expanded PTFE membrane was used as the membrane material. The inlet air measured 23.7° C. and 11% relative humidity (RH). The outlet air measured 16.8° C. and 40% RH. The air flow rate was 30 LPM. The water inlet temperature was 19.3° C. The water outlet temperature was 16.3° C. The water flow rate was 2.62 g/s (9.4 LPH). A cooling rate of 32.9 W was achieved.

Example 8

Evaporator Performance Using Dense Polyurethane Membrane

Figure 32:
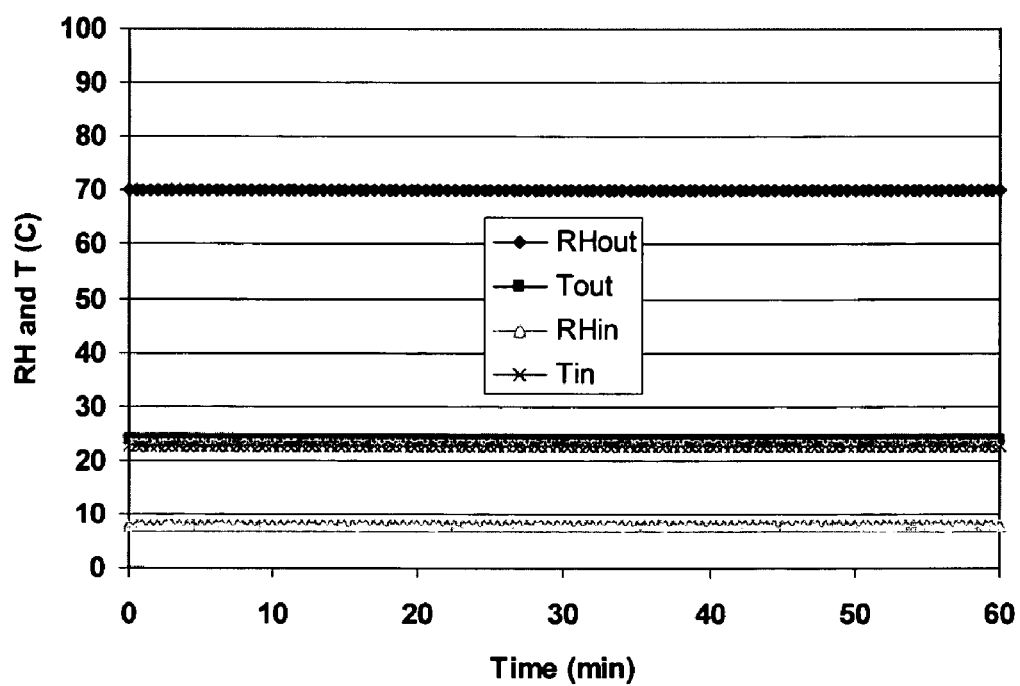
FIG. 32 is a graph depicting relative humidity and temperature measurements versus time for one embodiment of a sorption cooling device of the present invention.
Figure 33:
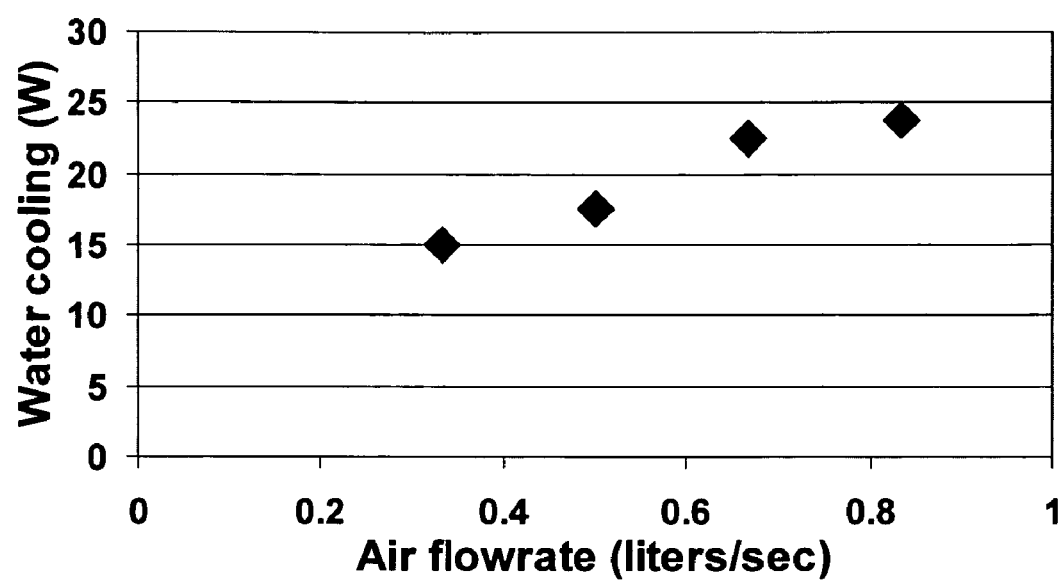
FIG. 33 is a graph depicting water cooling rate versus air flow rate through an evaporator according to one embodiment of the present invention.

An evaporator module was assembled using a dense polyurethane membrane. Water at about 26° C. was flowed through the water flow channels of the evaporator at 3 grams/sec (~2.8 gal per hour). Compressed air at about 7–9% RH was flowed through the air flow channels at various flow rates (0.33, 0.50, 0.67 and 0.83 LPS). The inlet and outlet air temperature and relative humidity were measured over time, the results of which are depicted in FIG. 32 for the 0.33 LPS air flow rate. Even though the inlet air stream had only about 7% RH, the outlet air stream had an about 70% RH, which remained constant for a 1 hour test. An increased cooling performance was also witnessed at higher air flow rates, as depicted in FIG. 33.

While various embodiments of the present invention have been described in detail, it is apparent that modifications and adaptations of those embodiments will occur to those skilled in the art. However, is to be expressly understood that such modifications and adaptations are within the spirit and scope of present invention.

What is claimed is:

1. A closed-loop sorption cooling system for providing cooled air to the cabin of a vehicle, the sorption cooling system comprising:
    an evaporator;
    a condenser adapted for fluid communication with said evaporator; and
    a plurality of adsorbent beds adapted for fluid communication with said condenser and said evaporator, each adsorbent bed comprising:
        i. a fluid impermeable casing comprising a refrigerant inlet, a refrigerant outlet, a coolant inlet and a coolant outlet;
        ii. a first desiccant sheet comprising a first aperture therethrough and a first adsorbent side; and
        iii. a second desiccant sheet comprising a second aperture therethrough and a second adsorbent side;
        iv. a refrigerant flow path for flowing a refrigerant fluid between said refrigerant inlet and refrigerant outlet, said refrigerant path being at least partially defined by said first and second adsorbent sides; and
        v. a coolant flow path for flowing a coolant fluid between said coolant inlet and said coolant outlet, said coolant flow path being fluidly isolated from said refrigerant flow path and being adjacent to at least one of said first and second desiccant sheets;
    wherein said first and second apertures are a portion of one of said refrigerant flow path and said coolant flow path.

2. The closed-loop sorption cooling system of claim 1, wherein said refrigerant fluid consists essentially of water and said coolant fluid is in the liquid-phase.

3. The closed-loop sorption cooling system of claim 2, wherein said coolant is a liquid used in cooling of an internal combustion engine.

4. The closed-loop sorption cooling system of claim 1, wherein said first and second adsorbent sides are substantially parallel to each other and are separated by not greater than 5 millimeters.

5. The closed-loop sorption cooling system of claim 1, wherein at least one of said refrigerant flow path and said coolant flow pat is non-linear.

6. The closed-loop sorption cooling system of claim 1, wherein said apertures are a portion of said refrigerant flow path and said refrigerant flow path is non-linear.

7. The closed-loop sorption cooling system of claim 1, wherein said apertures are a portion of said coolant flow path and said coolant flow path is non-linear.

8. The closed-loop sorption cooling system of claim 1, wherein at least one of said first and second desiccant sheets comprise a plurality of apertures, said plurality of apertures being a portion of one of said refrigerant flow path and said coolant flow path.

9. The closed-loop sorption cooling system of claim 1, wherein the pressure within any of said evaporator, said condenser and said plurality of adsorbent beds does not exceed 14.7 psig.

10. The closed-loop sorption cooling system of claim 1, further comprising a third desiccant sheet disposed between said first and second desiccant sheets, said third desiccant sheet comprising a third aperture, said third aperture being a portion of one of said refrigerant flow path and said coolant flow path.

11. The closed-loop sorption cooling system of claim 10, wherein at least a portion of said coolant fluid path is adjacent to both said first adsorbent sheet and said third adsorbent sheet.

12. The closed-loop sorption cooling system of claim 1, wherein said first desiccant sheet comprises carbon impregnated with a metal salt selected from the group consisting of lithium chloride, calcium chloride and mixtures thereof.

13. A multiple-stage sorption cooling system comprising the closed-loop sorption cooling system of claim 1.

14. A method of providing cooled air to the interior of a vehicle, the method comprising:
    evaporating an aqueous-based refrigerant in an evaporator, said evaporator comprising a thermally conductive sidewall;
    flowing air proximal to said thermally conductive sidewall to produce cooled air;
    adsorbing the aqueous-based refrigerant in an adsorber, the adsorber comprising:
    i. a plurality of desiccant sheets comprising a carbon impregnated with a metal salt, each of said plurality of sheets comprising at least one aperture; and
    ii. a coolant flow path fluidly isolated from a refrigerant flow path, wherein said at least one aperture is a portion of one of said coolant flow path and said refrigerant flow path; and
    providing said cooled air to the interior of the vehicle.

15. The method of claim 14, further comprising the steps of:
    circulating a hot liquid-phase coolant through said coolant flow path;
    condensing said aqueous-based refrigerant; and
    supplying said condensed aqueous-based refrigerant to said evaporator.

16. The method of claim 14, further comprising the step of:
    circulating a cold coolant through said coolant flow path.

17. The method of claim 16, wherein said circulating of cold coolant step and said adsorbing step are at least partially overlapping.

18. The method of claim 16, wherein said cold coolant is in a liquid-phase.

19. The method of claim 16, further comprising the step of:
    circulating a hot liquid-phase coolant through said coolant flow path, wherein said circulating a cold coolant step and said circulating a hot liquid-phase coolant step are non-overlapping.

20. The method of claim 14, wherein said adsorber is a first adsorber, said coolant flow path is a first coolant flow path, the method further comprising:
    during said adsorbing step, circulating a cold coolant through said first coolant flow path of said first adsorber; and
    circulating a hot liquid-phase coolant through a second coolant flow path of a second adsorber, wherein said circulating a hot liquid-phase coolant step and circulating a cold coolant step are at least partially overlapping.

21. The method of claim 20, further comprising the step of:
    circulating said cold coolant through a third coolant flow path of a third adsorber.

22. The method of claim 20, further comprising the step of:
    during said adsorbing step, circulating said cold coolant through a third coolant flow path of a third adsorber.

23. The method of claim 14, wherein said evaporator is a first evaporator, the method further comprising:
    prior to said providing said cooled air to the interior of the vehicle step, flowing said air proximal to a second evaporator, wherein said first evaporator is an element of a first sorption cooling system, said second evaporator is an element of a second sorption cooling system, and wherein said first and second sorption cooling systems are a portion of a multiple-stage sorption cooling system.

24. A sorption cooling system for providing cooled air to the cabin of a vehicle, the system comprising:
    a refrigerant source;
    an adsorber; and
    a thin-film evaporator fluidly connected to said refrigerant source, said evaporator comprising:
    i. a sheet of vapor-permeable and liquid impermeable membrane material;
    ii. an air flow channel proximal to a first side of said membrane material;
    iii. a refrigerant flow channel proximal to a second side of said membrane material; and
    iv. a thermally conductive sidewall proximal to said refrigerant flow channel; and
    a cabin air flow path fluidly connected to said cabin of said vehicle, a portion of said cabin air flow path being proximal to said thermally conductive sidewall.

* * * * *

UNITED STATES PATENT AND TRADEMARK OFFICE
CERTIFICATE OF CORRECTION

| | | |
|---|---|---|
| PATENT NO. | : 7,143,589 B2 | Page 1 of 1 |
| APPLICATION NO. | : 11/147971 | |
| DATED | : December 5, 2006 | |
| INVENTOR(S) | : Smith et al. | |

It is certified that error appears in the above-identified patent and that said Letters Patent is hereby corrected as shown below:

Column 11
Line 58, delete "effiency" and insert therefor --efficiency--.

Signed and Sealed this

Thirteenth Day of March, 2007

JON W. DUDAS
*Director of the United States Patent and Trademark Office*